United States Patent
Nakatsugawa

(10) Patent No.: US 8,224,344 B2
(45) Date of Patent: Jul. 17, 2012

(54) PARAMETER COLLECTING METHOD, WIRELESS BASE STATION AND RELAY STATION

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 12/794,247

(22) Filed: Jun. 4, 2010

(65) Prior Publication Data

US 2010/0240388 A1  Sep. 23, 2010

Related U.S. Application Data

(63) Continuation of application No. PCT/JP2007/073445, filed on Dec. 5, 2007.

(51) Int. Cl.
*H04W 72/08* (2009.01)
(52) U.S. Cl. .................. 455/452.2; 455/509; 455/67.11; 455/452.1
(58) Field of Classification Search .............. 455/452.1, 455/69, 11.1, 63.1, 9, 15, 517, 423, 452.2, 455/24, 67.11, 509, 450, 453
See application file for complete search history.

(56) References Cited

U.S. PATENT DOCUMENTS

| | | |
|---|---|---|
| 6,106,432 A | 8/2000 | Nishida |
| 2003/0125067 A1 | 7/2003 | Takeda et al. |
| 2006/0153132 A1 | 7/2006 | Saito |
| 2007/0155338 A1* | 7/2007 | Hong et al. ............... 455/69 |
| 2009/0061767 A1* | 3/2009 | Horiuchi et al. .......... 455/18 |
| 2009/0227201 A1* | 9/2009 | Imai et al. ................ 455/7 |
| 2011/0151773 A1* | 6/2011 | Okuda ....................... 455/9 |

FOREIGN PATENT DOCUMENTS

| | | |
|---|---|---|
| JP | 2002064871 | 2/2002 |
| JP | 2003258719 | 9/2003 |
| JP | 2004-172719 | 6/2004 |
| JP | 2005252677 | 9/2005 |
| JP | 2006196985 | 7/2006 |
| JP | 2007110411 | 4/2007 |
| WO | 2006098273 A1 | 9/2006 |

OTHER PUBLICATIONS

International Search Report dated Mar. 11, 2008 in corresponding International application No. PCT/JP2007/073445.

(Continued)

*Primary Examiner* — John J Lee
(74) *Attorney, Agent, or Firm* — Fujitsu Patent Center

(57) ABSTRACT

A parameter collecting method used for distributing radio resources, collecting a total number (M) of terminals for directly performing radio communication with a radio base station without a relay station or radio quality between each of terminals for directly performing radio communication with the radio base station without the relay station as a parameter, and collecting a total number (N) of terminals performing communication with the radio base station through the relay station or aggregated information on radio quality between the respective terminals performing communication with the radio base station through the relay station and the relay station as the parameter.

17 Claims, 21 Drawing Sheets

OTHER PUBLICATIONS

IEEE Standard for Local and metropolitan area networks Part 16: Interface for Fixed and Mobile Broadband Wireless Access Systems Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16-2004/Cor1-2005 Feb. 28, 2006.

IEEE P802.16j/D1 (Aug. 2007) Draft Standard for Local and Metropolitan Area Networks Part 16: Air Interface for Fixed and Mobile Broadband Wireless Access Systems Multihop Relay Specification.

International Preliminary Report on Patentability and Written Opinion of the International Searching Authority in PCT/JP2007/073445 dated Aug. 19, 2010.

Japanese Office Action mailed Feb. 28, 2012 for corresponding Japanese Application.

Tzu-Ming Lin, et al., "Modification for enabling RS Operation", IEEE 802.16 Presentation Submission Template (Rev. 8.3), Doc No. IEEE C80216mmr-05_029r2, Nov. 16, 2005, IEEE 802.16 Session #40, Vancouver, Canada.

* cited by examiner

FIG. 14

CALCULATION OF RESOURCE DISTRIBUTION RATIO $$R_{BS} = w_{BS} \cdot R_{all} \cdot J_{BS} / (J_{BS} + J_{RS})$$
$$R_{RS} = w_{RS} \cdot R_{all} \cdot J_{RS} / (J_{BS} + J_{RS})$$

$R_{all}$ : RADIO RESOURCE QUANTITY DISTRIBUTABLE BY WIRELESS BASE STATION $w_{BS}$ : WEIGHT COEFFICIENT FOR ADJUSTING RESOURCE QUANTITY ALLOCATED TO MOBILE STATION PERFORMING COMMUNICATIONS DIRECTLY WITH BASE STATION $w_{RS}$ : WEIGHT COEFFICIENT FOR ADJUSTING RESOURCE QUANTITY ALLOCATED TO MOBILE STATION PERFORMING COMMUNICATIONS WITH BASE STATION VIA RELAY STATION

FIG. 15

CALCULATION OF RESOURCE DISTRIBUTION RATIO $R_{BS} = R_{all} \cdot w_{BS} \cdot J_{BS} / (J_{BS} \cdot w_{BS} + J_{RS} \cdot w_{RS})$
$R_{RS} = R_{all} \cdot w_{RS} \cdot J_{RS} / (J_{BS} \cdot w_{BS} + J_{RS} \cdot w_{RS})$ $R_{all}$ : RADIO RESOURCE QUANTITY DISTRIBUTABLE BY WIRELESS BASE STATION $w_{BS}$ : WEIGHT COEFFICIENT FOR ADJUSTING RESOURCE QUANTITY ALLOCATED TO MOBILE STATION PERFORMING COMMUNICATIONS DIRECTLY WITH BASE STATION $w_{RS}$ : WEIGHT COEFFICIENT FOR ADJUSTING RESOURCE QUANTITY ALLOCATED TO MOBILE STATION PERFORMING COMMUNICATIONS WITH BASE STATION VIA RELAY STATION

FIG. 16

CALCULATION OF RESOURCE DISTRIBUTION RATIO $$R_{BS} = R_{all} \cdot W_{BS} / (W_{BS} + W_{RS})$$
$$R_{RS} = R_{all} \cdot W_{RS} / (W_{BS} + W_{RS})$$

$R_{all}$ : RADIO RESOURCE QUANTITY DISTRIBUTABLE BY WIRELESS BASE STATION $W_{BS}$ : WEIGHT COEFFICIENT FOR ADJUSTING RESOURCE QUANTITY ALLOCATED TO MOBILE STATION PERFORMING COMMUNICATIONS DIRECTLY WITH BASE STATION $W_{RS}$ : WEIGHT COEFFICIENT FOR ADJUSTING RESOURCE QUANTITY ALLOCATED TO MOBILE STATION PERFORMING COMMUNICATIONS WITH BASE STATION VIA RELAY STATION

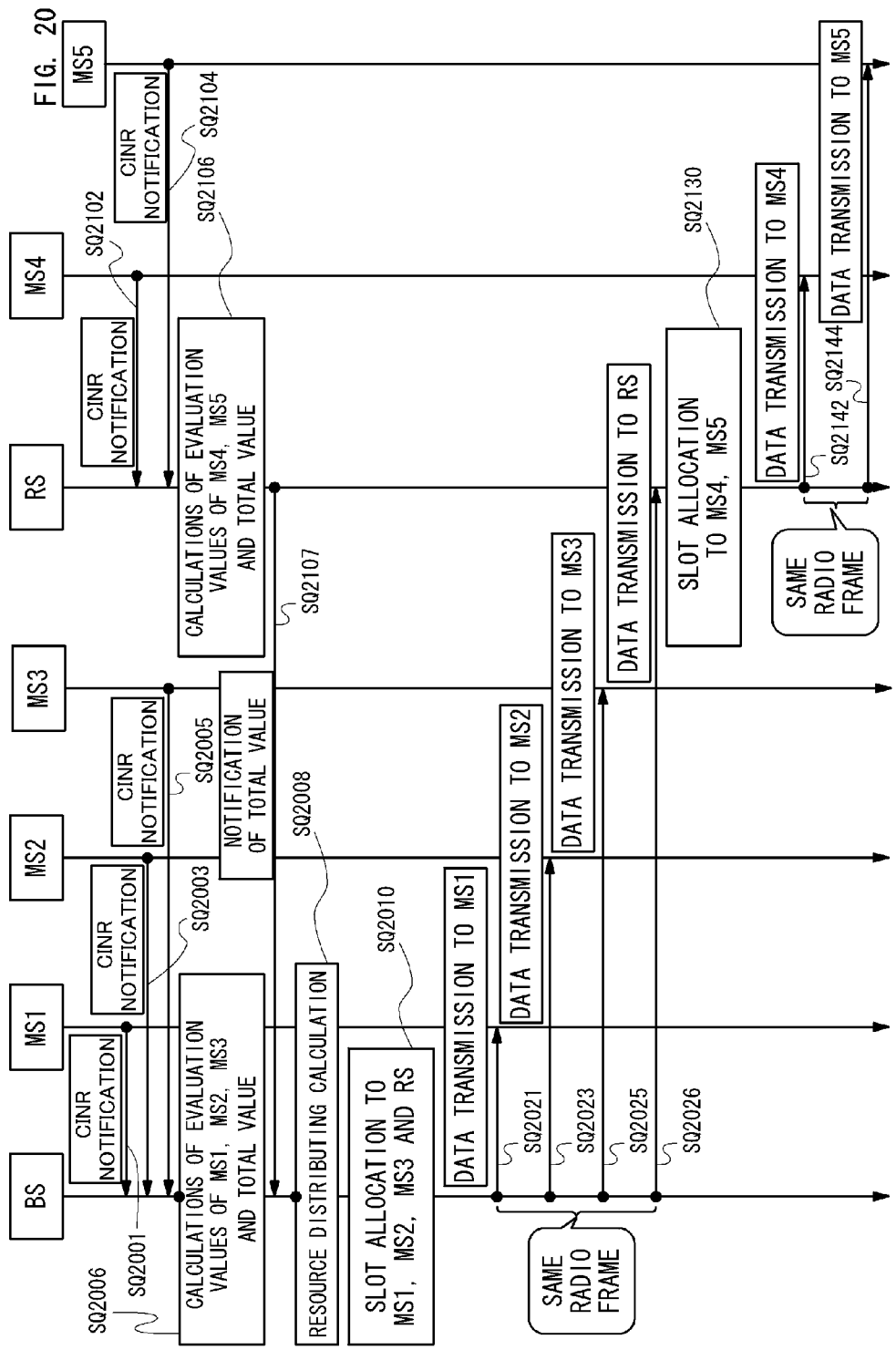

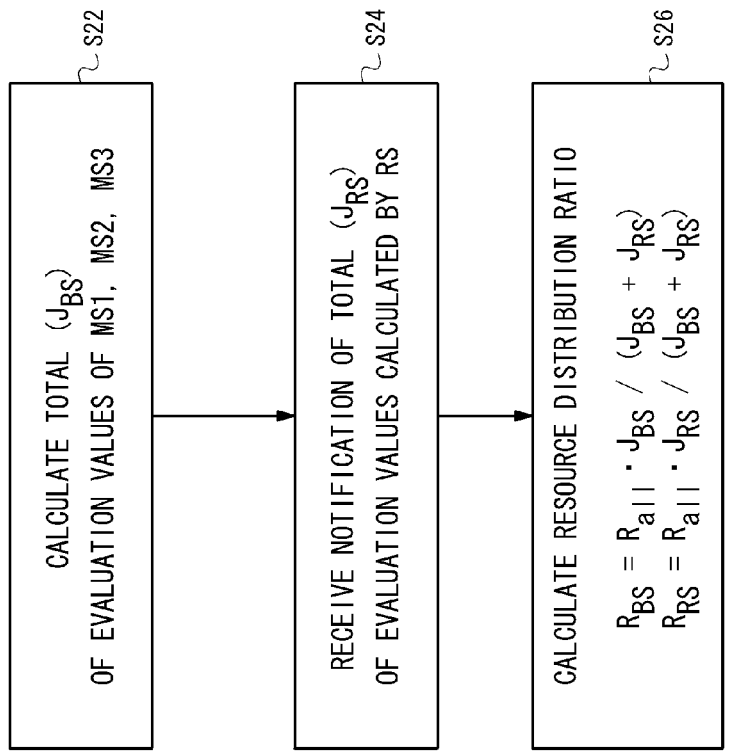

PARAMETER COLLECTING METHOD, WIRELESS BASE STATION AND RELAY STATION

CROSS-REFERENCE TO RELATED APPLICATIONS

This is a continuation of Application, filed under 35 U.S.C. §111(a) of International Application PCT/JP2007/073445, filed on Dec. 5, 2007, the contents of which are herein wholly incorporated by reference.

FIELD

The present invention relates to a parameter collecting method of collecting parameters used for distributing radio resources, a wireless base station which collects the parameters, and a relay station which relays between the wireless base station and a wireless terminal (wireless mobile station).

BACKGROUND

Over the recent years, a technology called WiMAX (Worldwide Interoperability for Microwave Access) has been focused as one of wireless communication technologies. The WiMAX is the technology developed as a technique of configuring Wireless MAN (Metropolitan Area Network) by wirelesslizing the MAN in place of a telephone line and an optical fibre line. The MAN is defined as a wide area network which mutually connects LANs (Local Area Networks) in the metropolitan areas and specified local areas by enabling a wireless connection between a common carrier and a user's home to be established. The WiMAX is said to enable one single wireless base station to cover an area extending 50 km in radius at a transmission speed of approximately 70 Mbps at the maximum.

At the present time, the IEEE (Institute of Electrical and Electronic Engineers) standardizes, e.g., Non-Patent document 1 as the WiMAX oriented to fixed terminals and the WiMAX oriented to mobile terminals.

In the wireless communication system such as the WiMAX, normally the communications are performed between the wireless base station connected via a wired link to a high-order network and a wireless terminal (which will hereinafter be also simply termed a [terminal]). Further, the wireless communication system such as the WiMAX introduces a relay station which wirelessly performs relay-forwarding between the wireless base station and the terminal, thereby enabling the communication area to be expanded and a communication throughput of the terminal to be improved.

FIG. 1 is a view depicting an outline of the wireless communication system in the case of carrying out mobile-oriented wireless relay communications.

The wireless communication system illustrated in FIG. 1 is configured by including a wireless base station (BS: Base Station), a relay station (RS: Relay Station) and a terminal (MS: Mobile Station). In the example of FIG. 1, four mobile stations MS1-MS4 exist. The mobile stations MS1 and MS2 are located in an area enabling the MS1, MS2 to perform direct communications with the base station BS. Further, the mobile stations MS3 and MS4 are located in an area enabling the MS3, MS4 to perform the communications with the base station BS via the relay station RS. The base station BS is connected to a high-order network (unillustrated) and forwards pieces of data, which are transmitted and received by the mobile stations MS1-MS4, to the high-order network.

The mobile stations MS1 and MS2 perform the communications with the base station BS by transmitting and receiving radio signals directly to and from the base station BS. The mobile stations MS3 and MS4 transmit and receive the radio signals to and from the relay station RS, and the relay station RS serving as a proxy station of the mobile station MS3 or MS4 transmits and receives the radio signals to and from the base station BS, thus performing the communications. The relay station RS operates (behaves) as if appearing equal to the mobile station when viewed from the base station BS. Further, the relay station RS operates as if appearing equal to the base station BS when viewed from the mobile stations MS3 and MS4. The relay station RS temporarily receives the radio signals transmitted by the base station BS or the mobile stations MS3, MS4, and relay-forwards the radio signals for the sake of the mobile stations MS3 and MS4 or the base station BS by executing necessary processes.

The standardization of this type of relay communication method in the mobile-oriented wireless communication system is currently underway as Multi-hop Relay (MR) according to IEE802.16j. For example, Non-Patent document 2 is opened to the public as Draft Standard according to IEE802.16j.

[Patent document 1] Japanese Patent Laid-Open Publication No. 2005-252677

[Patent document 2] Japanese Patent Laid-Open Publication No. 2003-258719

[Patent document 3] Japanese Patent Laid-Open Publication No. 2006-196985

[Non-Patent document 1] IEEE Standard 802.16e-2005 AND 802.16-2004/Cor1-2005 (2006-2-28)

[Non-Patent document 2] IEEE P802.16j/D1 (2007-08-08)

SUMMARY

The following problems, however, arise in such wireless relay communications.

The base station BS allocates slots on a radio frame in a way that conducts scheduling in order to transmit and receive data between the mobile stations MS1-MS4. A Proportional Fairness (PF) algorithm, which takes fairness between the mobile stations MSs into consideration, is known as a scheduling algorithm in the wireless communication system such as this. The PF algorithm is the scheduling algorithm for measuring radio channel qualities between the respective mobile stations MSs and the base station BS, calculating evaluation values of the respective mobile stations MSs from an instantaneous value and an average value thereof and determining priority levels of allocating the radio resources to the mobile stations MSs on the basis of the evaluation values. The radio channel quality is exemplified by CINR (Carrier to Interference Noise Ratio), in which the evaluation value of each mobile station MS is given by instantaneous CINR/average CINR. Herein, in addition to the CINR, other wireless channel quality indexes such as SINR (Signal to Interference Noise Ratio) and RSSI (Receive Signal Strength Indicator) may also be utilized.

According to this PF algorithm, for instance, if the radio channel quality changes in an improving direction as when the mobile station MS moves close to the base station BS, the priority level is set high. While on the other hand, if the radio channel quality changes in a deteriorating direction as when the mobile station MS moves away from the base station BS, the priority level is set low. This contrivance leads to such an advantage that the slot is preferentially allocated to the mobile station MS in a radio channel status where an reception error is hard to occur with the result that a throughput of the whole base station BS is improved and an average slot allocation chance becomes impartial between the mobile stations MSs irrespective of a data size in terms of absolute quantity of the data transmitted and received by the respective mobile stations MSs.

FIG. 2 is a diagram illustrating an example of how the radio resources are allocated in the case of applying the PF scheduling algorithm to the wireless relay communication system.

The mobile stations MS1 and MS2 measure the CINR between the base station BS and the mobile stations MSs and notify the base station BS of the measured CINR. Further, the mobile stations MS3 and MS4 measure the CINR between the relay station RS and the mobile stations MSs and notify the relay station RS of the measured CINR. Herein, the relay station RS appears equal to the mobile station MS as viewed from the base station BS, and hence it is considered that the relay station RS also measures the CINR between the base station BS and the relay station RS and notifies the base station BS of the measured CINR. Note that the example is herein given on the premise that the CINR of the radio signals along a downlink from the base station BS toward the mobile station MS and the relay station RS is measured, while the base station BS performs downlink scheduling, however, the same operation is, it may be said, applied to a case in which the base station BS measures the CINR of the radio signals along an uplink from the mobile station MS and the relay station RS and performs uplink scheduling.

The base station BS calculates, based on the CINR of which each of the mobile stations MS1, MS2 and the relay station RS notify, the evaluation values for determining the scheduling priority levels. As described above, according to the PF algorithm, the evaluation value of each mobile station MS is given by instantaneous CINR/average CINR. For simplicity, supposing that neither the mobile stations MS1, MS2 nor the relay station RS move and the radio channel quality remains unchanged for a comparatively long period of time, the instantaneous CINR and the average CINR take the same value, and the evaluation values of the mobile stations MS1, MS2 and the relay station RS are all "1". This implies that the radio resource allocation chances to the mobile stations MS1, MS2 and the relay station RS are equalized to ⅓. Herein, a variety of definitions about the radio resource allocation chance are considered depending on the units of resources for the allocation. For example, when a transmission slot within one downlink radio frame is set as the unit and if the transmission slots total to 30 slots, it is considered that 10 slots are allocated to the mobile stations MS1, MS2 and the relay station RS, respectively. Further, a thinkable allocation scheme is that all of the transmission slots of the n-th downlink radio frame are allocated to the mobile station MS1, all of the slots of the (n+1)th downlink radio frame are allocated to the mobile station MS2, and all of the slots of the (n+2)th downlink radio frame are allocated to the relay station RS, in which this allocation process is repeated. Moreover, when a transmission queued packet addressed to each of the mobile stations MS1, MS2 and the relay station RS (actually, the mobile stations MS3, MS4) is set as the unit, it is also considered that the allocation is done based on a round robin algorithm so as to transmit the same number of packets.

Like the mobile stations MS3 and MS4 illustrated in FIG. 2, however, there exist the terminals performing the communications via the relay station RS in the wireless relay communication system. If the base station BS performs scheduling based on the CINR of the relay station RS as a representative of the mobile stations MS3 and MS4, in the example described above, it follows that ⅓ of the resources of the whole base station BS are allocated to the relay station RS. If only one mobile station MS3 exists under the relay station RS, the mobile station MS3 can consume all of the resources allocated by the base station BS to the relay station RS, and hence the resource allocation quantity of each of the mobile stations MS1-MS3 becomes ⅓ of the entire resources, thus keeping the fairness among the mobile stations (terminals). If the two mobile stations MS3, MS4 exist under the relay station RS as in FIG. 2, however, the resources allocated to the mobile stations MS3 and MS4 are halved to ⅙, and the allocation quantity of the resources to the mobile stations MS3 and MS4 becomes smaller than the allocation quantity of the resources to the mobile stations MS1 and MS2.

FIG. 3 is a diagram illustrating an example of a transmission frame (downlink) of the wireless base station (BS) in the case where the problems described above arise. This is the example in such a case that the resource allocation chance is given on the unit of the transmission slot.

FIG. 3 depicts an OFDMA (Orthogonal Frequency Division Multiple Access) frame having a symbol×subchannel (subcarrier) structure, in which items of an uplink subframe and control information such as a preamble and a map are omitted. In the slots on the OFDMA frame, the slots allocated to the mobile stations MS3 and MS4 are a half of the slots allocated to the mobile stations MS1 and MS2.

FIG. 4 is a diagram illustrating an example of the transmission frame (downlink) of the relay station (RS) when the relay station (RS) transmits data addressed to the mobile stations MS3 and MS4, which are received from the wireless base station (BS) in FIG. 3. Note that the relay station RS relay-transmits the data to the mobile stations MS3 and MS4 after one frame or several frames since the relay station RS has received the data addressed to the mobile stations MS3 and MS4.

The present invention aims at enabling, in a wireless communication system, when a wireless base station and a wireless terminal perform communications directly or via a relay station, radio resources to be distributed in a way that takes traffic in the relay station into consideration.

According to an aspect of the invention, a parameter collecting method used for distributing radio resources, the method includes: collecting, as a parameter, a total number (M) of terminals performing wireless communications directly with a wireless base station without via a relay station or a radio quality between each of the terminals performing the wireless communications directly with the wireless base station without via the relay station and the wireless base station; and collecting, as a parameter, a total number (N) of the terminals performing the wireless communications with the wireless base station via the relay station or aggregated information of radio qualities between the respective terminals performing the wireless communication with the wireless base station via the relay station and the relay station.

According to an aspect of the invention, while restraining an information quantity for exchanging the information used for distributing the radio resources between the wireless base station and the relay station, the wireless base station can efficiently collect the parameters used for distributing the radio resources.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 14 is a diagram illustrating an example of a resource distributing calculation formula in the case of adjusting the distribution of the radio resources with weight coefficients.

FIG. 15 is a diagram illustrating another example of the resource distributing calculation formula in the case of adjusting the distribution of the radio resources with weight coefficients.

FIG. 16 is a diagram illustrating still another example of the resource distributing calculation formula in the case of adjusting the distribution of the radio resources with weight coefficients.

FIG. 20 is a diagram illustrating an example of a communication sequence in the second embodiment.

FIG. 21 is a flowchart illustrating an example of a processing flow of the radio resource distributing calculation in the second embodiment.

DESCRIPTION OF EMBODIMENTS

Embodiments of the present invention will hereinafter be described with reference to the drawings. Configurations in the embodiments are exemplifications, and the present invention is not limited to the configurations in the embodiments.

First Embodiment

Configuration

<System>

Figure 1:
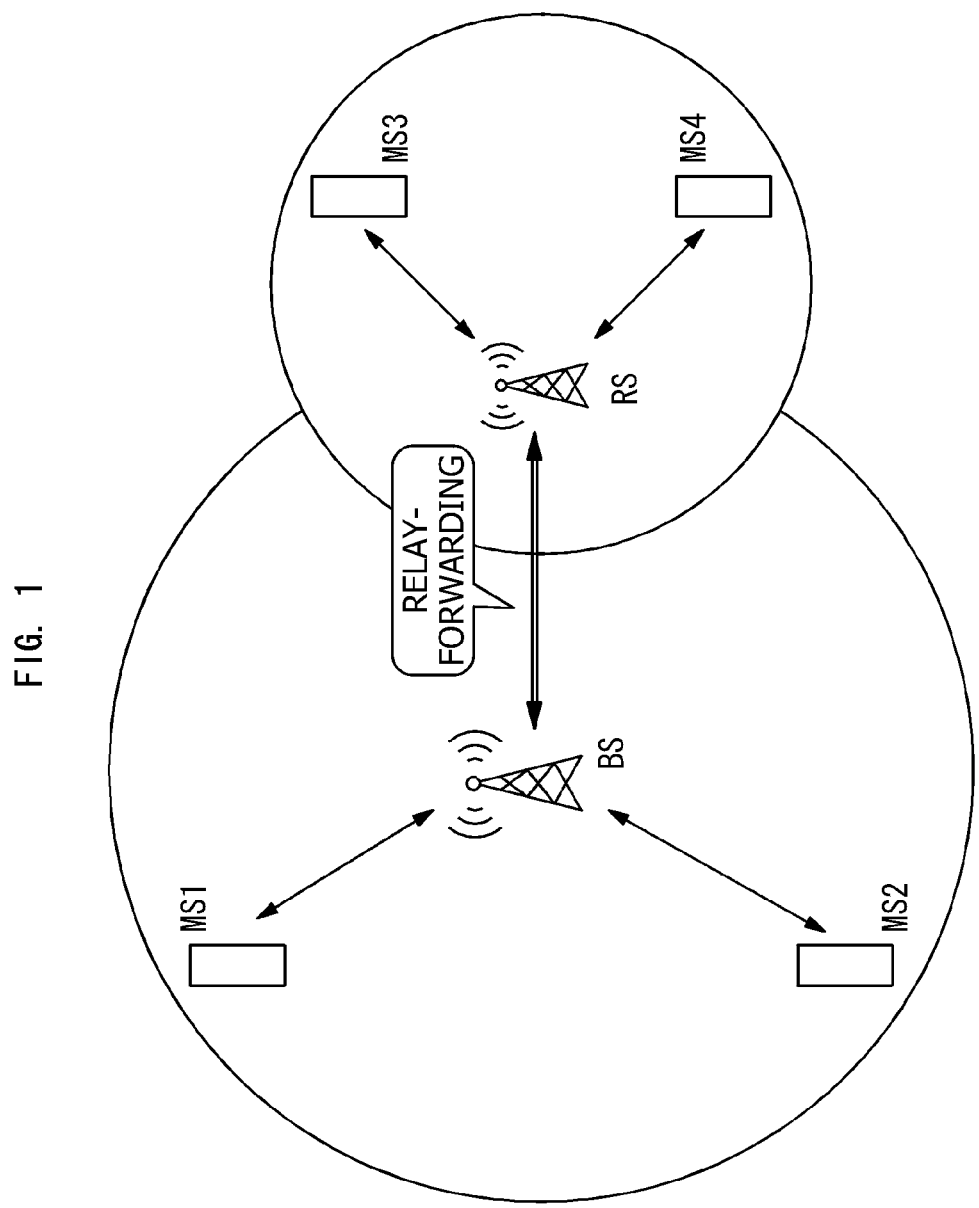
FIG. 1 is a view depicting an outline of a wireless communication system.
Figure 2:
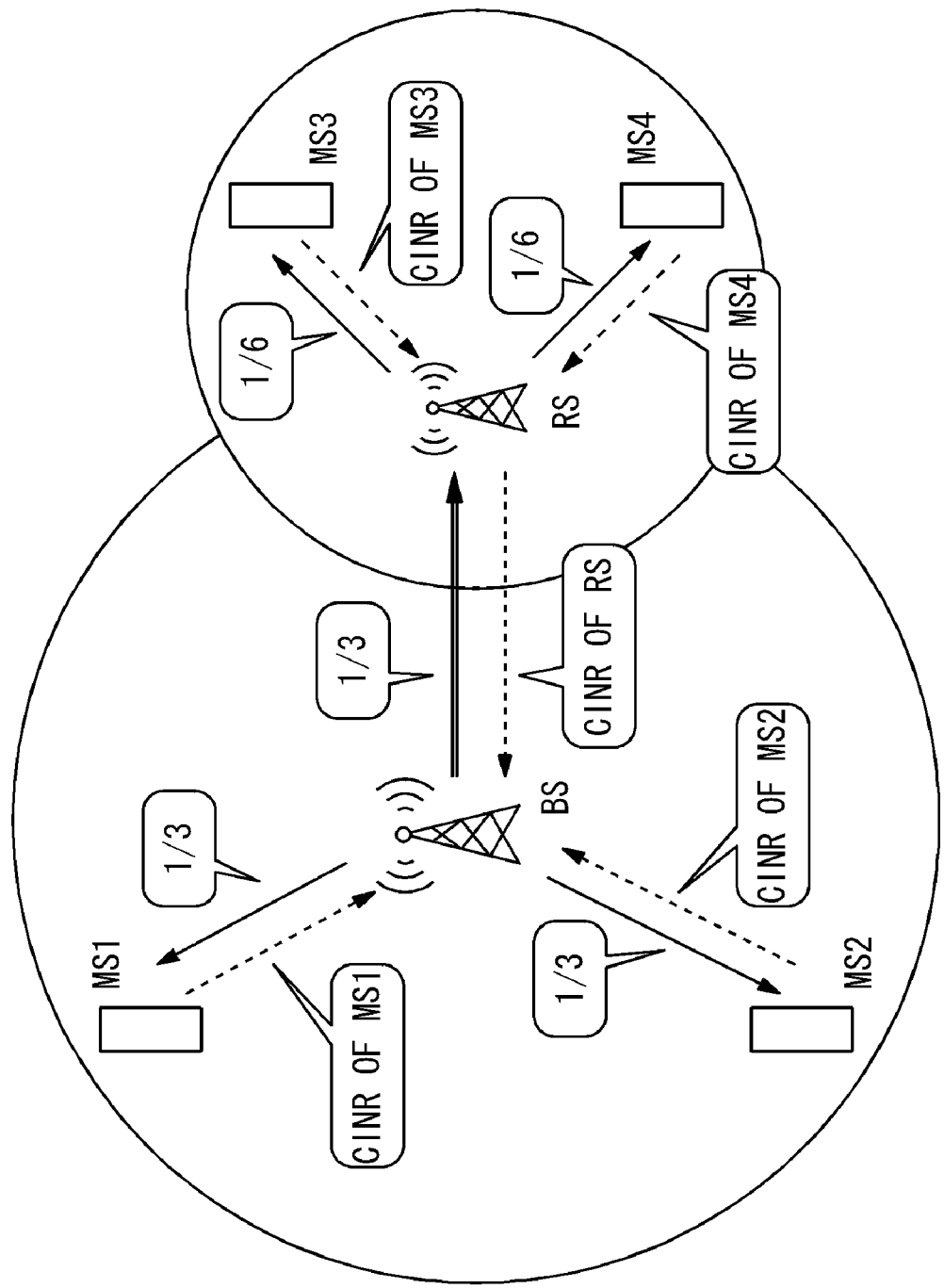
FIG. 2 is a diagram illustrating an example of how radio resources are allocated.
Figure 3:
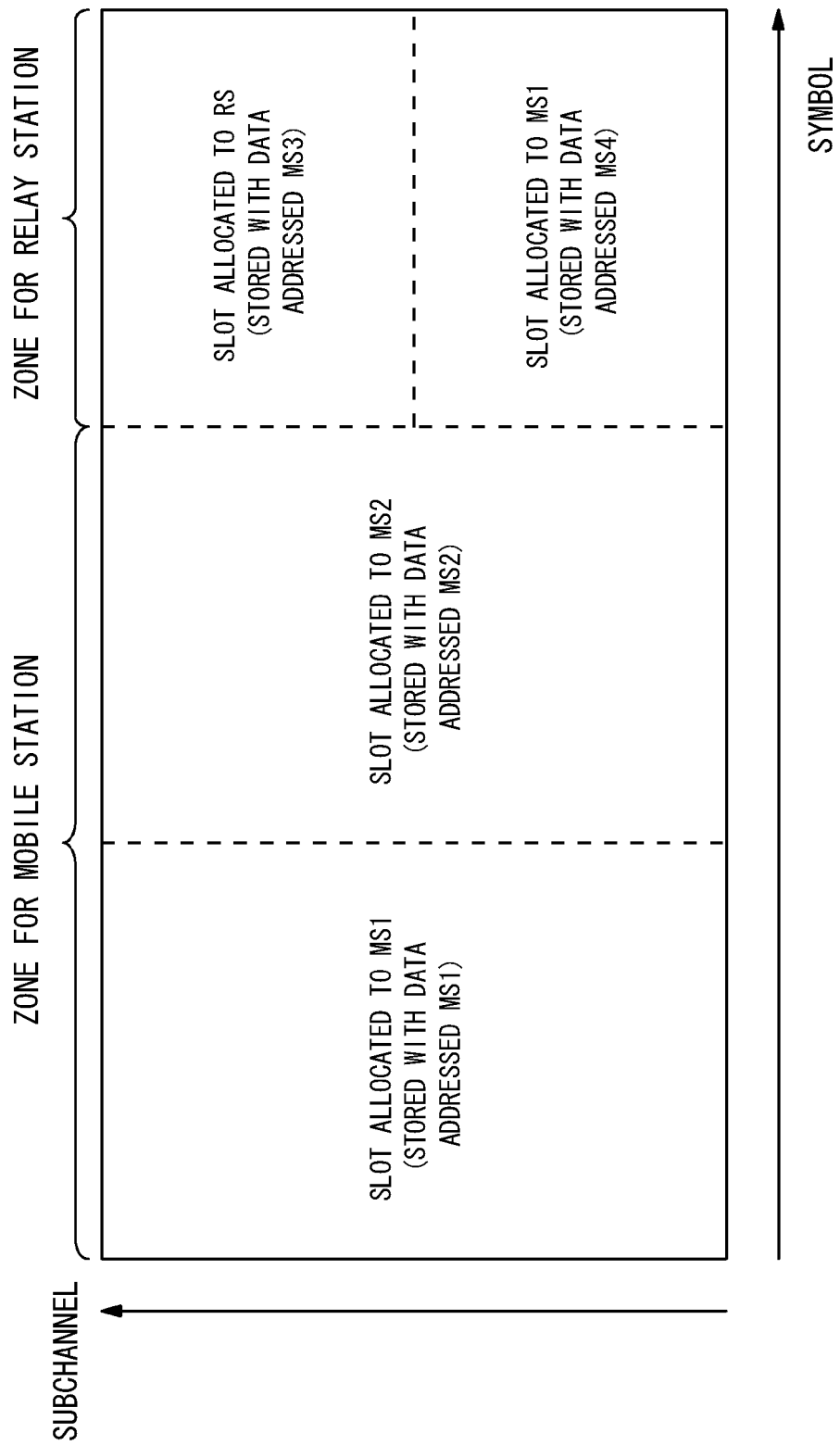
FIG. 3 is a diagram illustrating an example of a transmission frame of a wireless base station.
Figure 4:
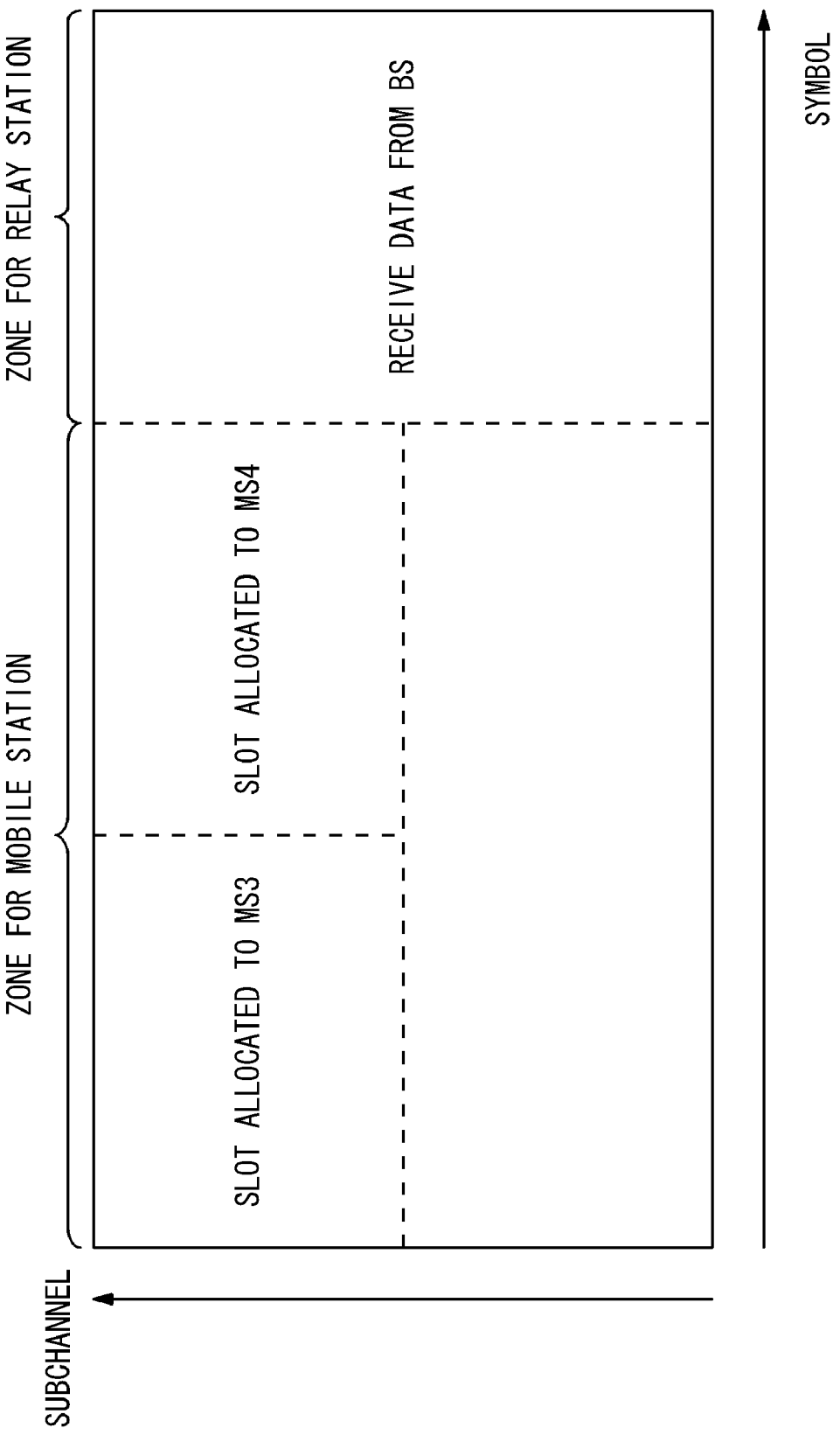
FIG. 4 is a diagram illustrating an example of the transmission frame of a relay station.
Figure 5:
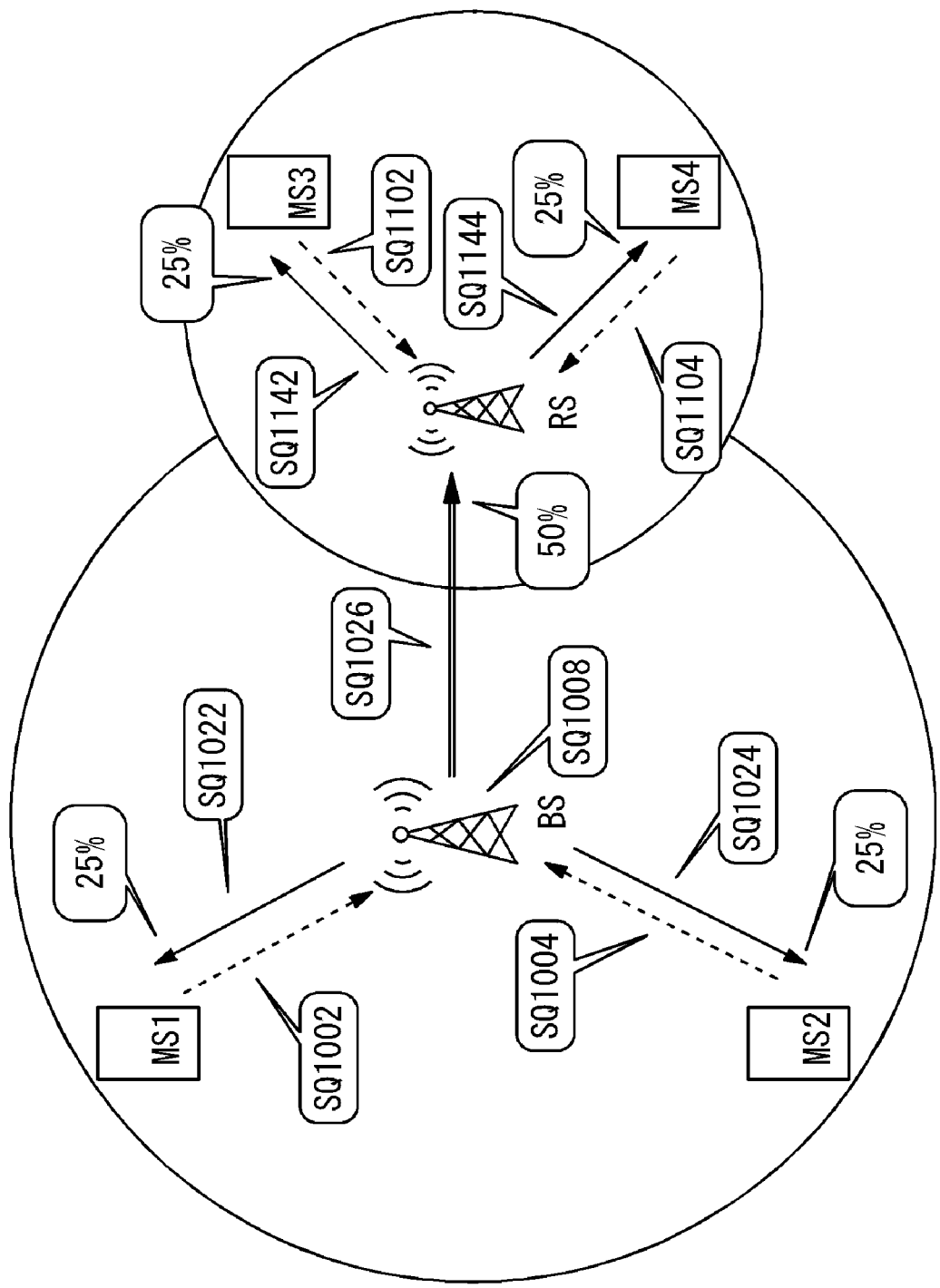
FIG. 5 is a diagram illustrating an outline of the wireless communication system in a first embodiment.

FIG. 5 is a view illustrating an outline of a wireless communication system in a first embodiment.

The wireless communication system illustrated in FIG. 5 includes a wireless base station (BS: Base Station), a relay station (RS: Relay Station) and wireless terminals (MSs: Mobile Stations). In the example of FIG. 5, four mobile stations (MSs) MS1-MS4 exist. The mobile stations MS1 and MS2 are located in an area enabling the MS1, MS2 to perform direct communications with the base station BS. Further, the mobile stations MS3 and MS4 are located in an area enabling the MS3, MS4 to perform the communications with the base station BS via the relay station RS. The base station BS is connected to a high-order network (unillustrated) and forwards pieces of data, which are transmitted and received by the mobile stations MS1-MS4, to the high-order network.

The mobile stations MS1 and MS2 perform the communications with the base station BS by transmitting and receiving radio signals directly (without via the relay station) to and from the base station BS. The mobile stations MS3 and MS4 transmit and receive the radio signals to and from the relay station RS, and the relay station RS serving as a proxy station of the mobile station MS3 or MS4 transmits and receives the radio signals to and from the base station BS, thus performing the communications. The relay station RS can operate (behave) as if appearing equal to the mobile station when viewed from the base station BS. Further, the relay station RS can operate as if appearing equal to the base station BS when viewed from the mobile stations MS3 and MS4. The relay station RS receives the radio signals transmitted by the base station BS or the mobile stations MS3, MS4, and relay-forwards the radio signals for the sake of the mobile stations MS3 and MS4 or the base station BS, respectively. The radio signals can be, on the occasion of their being forwarded, temporarily received, then, after being demodulated and undergoing a necessary process, modulated again and thus transmitted.

<Wireless Base Station>

Figure 6:
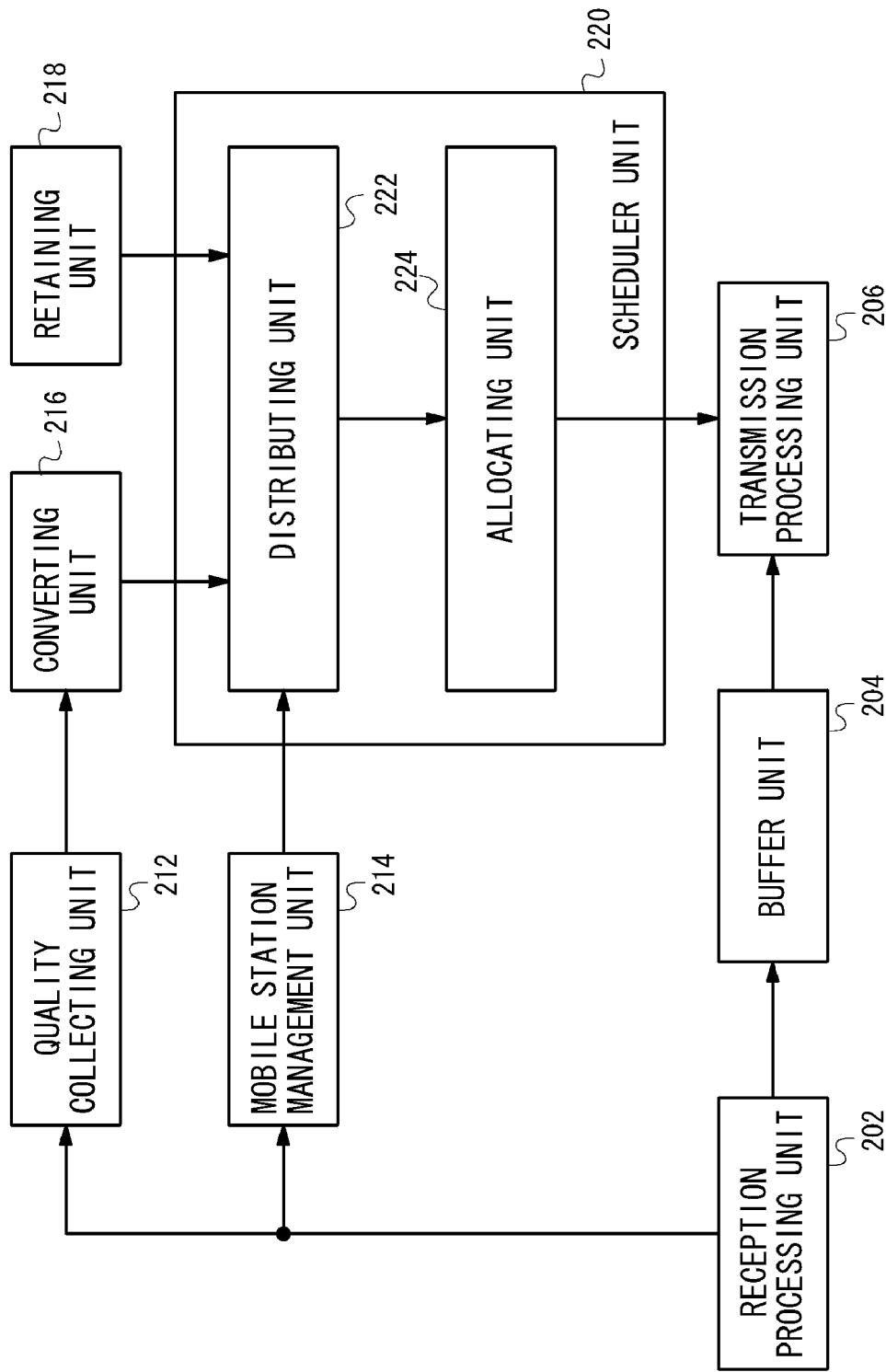
FIG. 6 is a diagram illustrating an example of a basic configuration of the wireless base station (BS) in the first embodiment.

FIG. 6 is a diagram illustrating an example of a basic configuration of the wireless base station (BS). The base station BS includes a reception processing unit 202, a buffer unit 204, a transmission processing unit 206, a quality collecting unit 212, a terminal (mobile station) management unit 214, a converting unit 216, a retaining unit 218, and a scheduler unit 220 having a distributing unit 222 and an allocating unit 224. Some arbitrary units among these units may operate as one single unit. For example, the quality collecting unit 212 and the converting unit 216 may operate as one single unit.

The reception processing unit 202 executes a receiving process of a radio frame transmitted by the wireless terminal (mobile station) or the relay station RS, and is connected to an unillustrated antenna.

The buffer unit 204 is temporarily stored with data and messages which are transmitted to the mobile station or the relay station RS.

The transmission processing unit 206 executes a transmitting process of the radio frame transmitted to the mobile station or the relay station RS, and is connected to the unillustrated antenna.

The quality collecting unit 212 collects pieces of radio channel quality information via the reception processing unit 202.

The mobile station management unit 214 manages identifiers and numbers of the mobile stations performing the direct communications with the base station BS and the mobile stations performing the communications with the base station BS via the relay station RS.

The converting unit 216 converts the radio channel quality information collected by the quality collecting unit 212 into an evaluation value.

The retaining unit 218 retains a virtual evaluation value of the mobile station MS performing the communications with the base station BS via the relay station RS. The retaining unit 218 can retain a weight coefficient for distributing radio resources.

The scheduler unit 220 includes the distributing unit 222 and the allocating unit 224.

The distributing unit 222 distributes the radio resources respectively into a resource quantity used for the base station and a resource quantity used for the relay station by employing the evaluation values obtained from the conversion by the converting unit 216. The distributing unit 222 can further distribute the radio resources by use of the weight coefficients retained by the retaining unit 218.

The allocating unit 224 allocates, based on the resource quantities distributed by the distributing unit 222, slots so as to store the radio frames with the transmission data of the mobile station performing the direct communications with the base station BS and transmission data of the mobile station performing the communications with the base station BS via the relay station RS.

<Relay Station>

Figure 7:
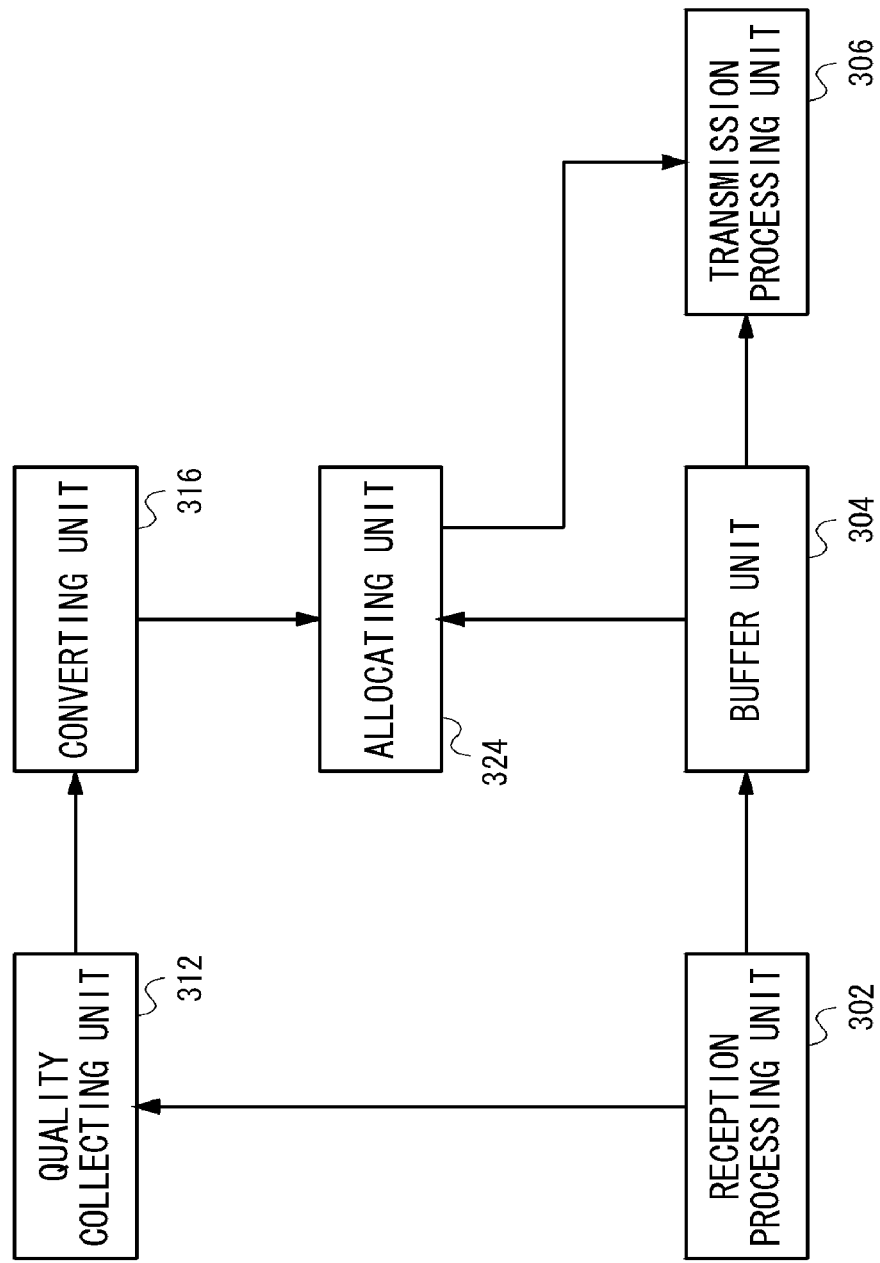
FIG. 7 is a diagram illustrating an example of a basic configuration of the relay station (RS) in the first embodiment.

FIG. 7 is a diagram illustrating an example of a basic configuration of the relay station (RS). The relay station RS includes a reception processing unit 302, a buffer unit 304, a transmission processing unit 306, a quality collecting unit 312, a converting unit 316 and an allocating unit 324. Some arbitrary units among these units may operate as one single unit. For example, the quality collecting unit 312 and the converting unit 316 may operate as one single unit.

The reception processing unit 302 executes the receiving process of the radio frame transmitted by the mobile station or the base station BS, and is connected to the unillustrated antenna.

The buffer unit 304 is temporarily stored with the data and the messages which are transmitted to the mobile station or the base station BS.

The transmission processing unit 306 executes the transmitting process of the radio frame transmitted to the mobile station or the base station BS, and is connected to the unillustrated antenna.

The quality collecting unit 312 collects pieces of radio channel quality information via the reception processing unit 302.

The converting unit 316 converts the radio channel quality information collected by the quality collecting unit 312 into the evaluation value.

The allocating unit 324 allocates, based on the evaluation value of the radio channel quality obtained from the conversion by the converting unit 316, transmission slots so as to store the radio frames with the transmission data of the mobile station performing the communications with the base station BS via the relay station RS.

Operation

Figure 8:
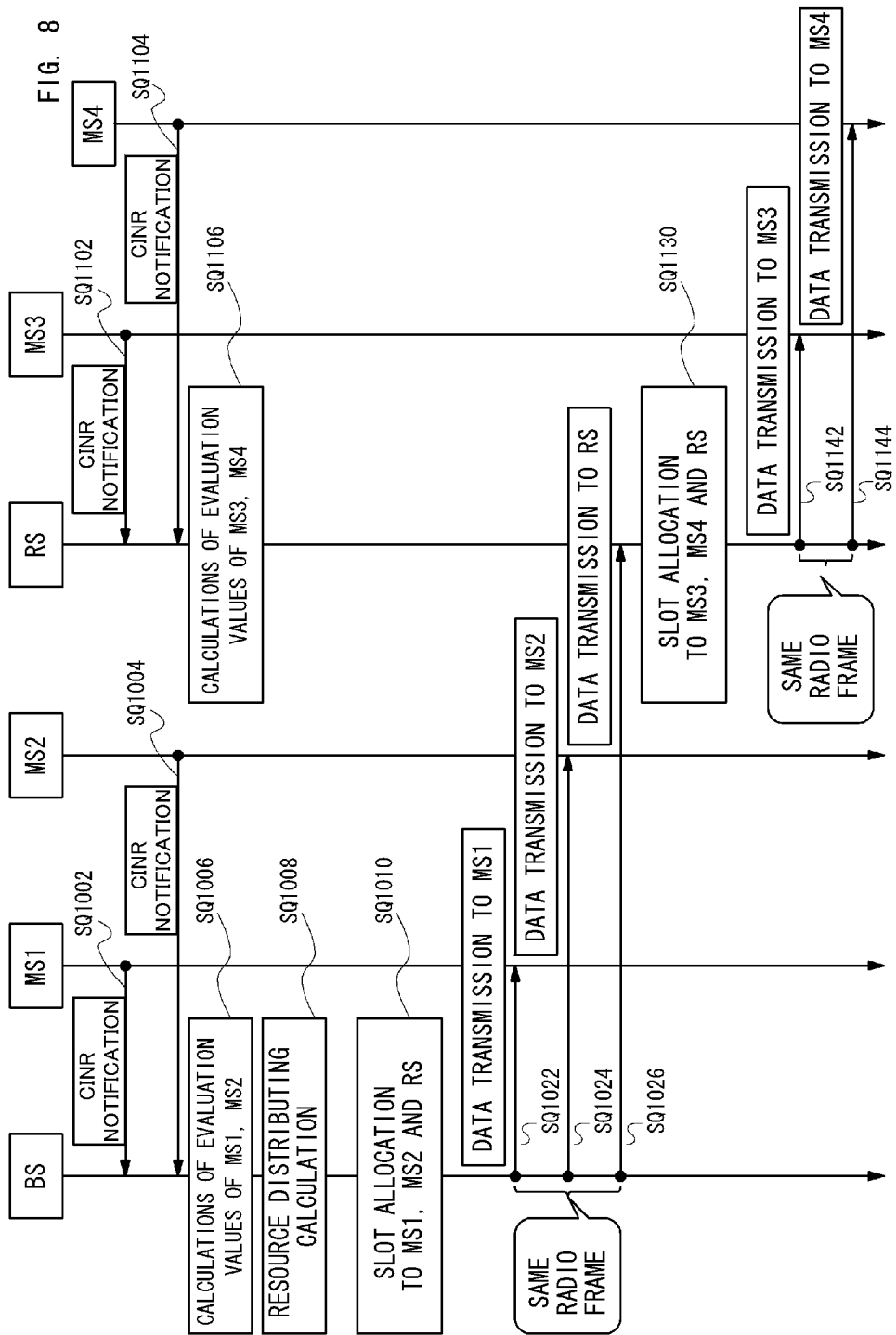
FIG. 8 is a diagram illustrating an example of a communication sequence in the first embodiment.

FIG. 8 is a diagram illustrating an example of a communication sequence in the first embodiment.

The mobile station MS1 measures a CINR (Carrier to Interference Noise Ratio) and notifies the wireless base station BS of the measured CINR as the radio channel quality information (SQ1002). Similarly, the mobile station MS2 measures the CINR and notifies the wireless base station BS of the measured CINR as the radio channel quality information (SQ1004). The notification thereof can involve using, in the case of IEEE802.16j system, a CQICH (Channel Quality Information Channel) message or an REP-RSP (Report Response) message.

Further, the mobile station MS3 measures the CINR and notifies the relay station RS of the measured CINR as the radio channel quality information (SQ1102). Similarly, the mobile station MS4 measures the CINR and notifies the relay station RS of the measured CINR as the radio channel quality information (SQ1104). The notification thereof can involve using, in the case of IEEE802.16j system, the CQICH (Channel Quality Information Channel) message or the REP-RSP (Report Response) message.

The radio channel quality can involve, without being limited to the CINR, using RSSI (Receive Signal Strength Indication) and SINR (Signal to Interference and Noise Ratio) as the radio channel quality.

The converting unit 216 of the base station BS calculates the evaluation values on the basis of the radio channel quality information (CINR information) collected from the mobile stations MS1, MS2 (SQ1006).

Further, the converting unit 316 of the relay station RS calculates the evaluation value on the basis of the radio channel quality information (CINR information) collected from the mobile stations MS3, MS4 (SQ1106).

The evaluation value can be set to, e.g., a value obtained by dividing an instantaneous value of the radio channel quality over an average value of the radio channel qualities.

The distributing unit 222 of the base station BS conducts a radio resource distributing calculation (SQ1008). A specific method of the radio resource distributing calculation will be described later on.

The allocating unit 224 of the base station BS, after distributing the radio resources, allocates the transmission slots to the data addressed respectively to the mobile stations MS1 and MS2 by use of the radio resources distributed for the base station BS. Further, the allocating unit 224 of the base station BS allocates the transmission slots to the data addressed respectively to the mobile stations MS3 and MS4, which should be relayed by the relay station RS, by use of the radio resources distributed for the relay station RS (SQ1010). A round robin algorithm, a PF (Proportional Fairness) algorithm, etc can be employed for the allocation thereof.

The transmission processing unit 206 of the base station BS generates, according to the allocated transmission slots, the radio frames stored with the transmission data addressed to the mobile stations MS1-MS4, and transmits the radio frames to the mobile stations MS1, MS2 and the relay station RS (SQ1022, SQ1024, SQ1026).

The reception processing unit 302 of the relay station RS receives the radio frames transmitted by the base station BS and extracts the transmission data addressed to the mobile stations MS3 and MS4. The allocating unit 324 of the relay station RS allocates the transmission slots on the radio frames transmitted by the relay station RS to the data addressed to the mobile stations MS3 and MS4 (SQ1130). The relay station RS, on the occasion of allocating the transmission slots, may utilize the evaluation values of the mobile stations MS3 and MS4, which are calculated in SQ1106. Moreover, the allocation thereof can involve using the round robin algorithm, the PF algorithm, etc.

The transmission processing unit 306 of the relay station RS generates, according to the allocated transmission slots, the radio frames stored with the transmission data addressed to the mobile stations MS3 and MS4 and transmits the radio frames to the mobile stations MS3, MS4 (SQ1142, SQ1144).

<Radio Resource Distributing Calculation>

Figure 9:
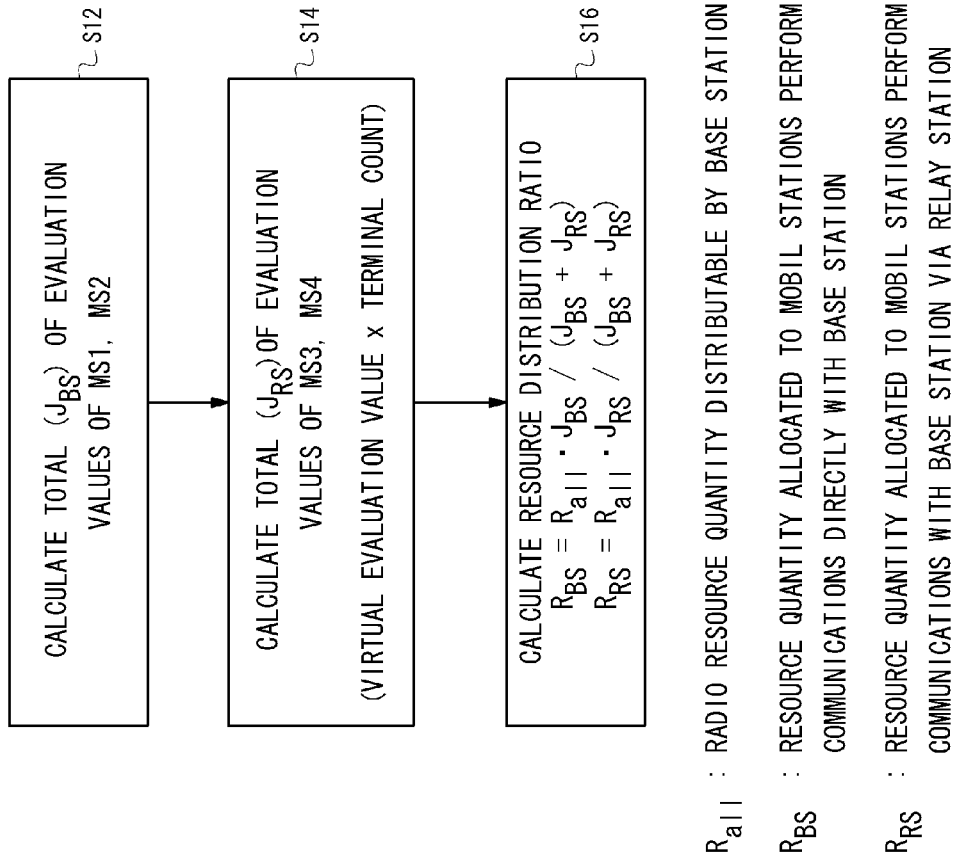
FIG. 9 is a flowchart illustrating an example of a processing flow of a radio resource distributing calculation in the first embodiment.

FIG. 9 is a flowchart illustrating a processing flow of the radio resource distributing calculation.

In this processing flow, the distribution of the radio resources is attained by distributing the distributable radio resources held by the wireless base station BS into the radio resources for the mobile stations MS performing the direct communications with the base station BS and into the radio resources for the mobile stations MS performing the communications with the base station BS via the relay station RS.

In the base station BS, the converting unit 216 converts the radio channel quality information, collected by the quality collecting unit 212, for every mobile station MS performing the direct communications with the base station BS into the evaluation value on the per-mobile-station-MS basis. The distributing unit 222 of the scheduler unit 220 calculates a total ($J_{BS}$) of the evaluation values obtained from the conversion by the converting unit 216 for every mobile station MS performing the direct communications with the base station BS (S12).

The distributing unit 222 of the scheduler unit 220 acquires, from the mobile station management unit 214, the information on the number of the mobile stations MS performing the communications with the base station BS via the relay station RS. Further, the distributing unit 222 obtains, from the retaining unit 218, pieces of information on the virtual evaluation values of the mobile stations MS performing the communications with the base station BS via the relay station RS. The distributing unit 222 calculates, based on a product of the mobile station count information and the virtual evaluation value information, a total ($J_{RS}$) of the evaluation values of the mobile stations MS performing the communications with the base station BS via the relay station RS (S14).

The distributing unit 222 of the scheduler unit 220 distributes the radio resources to the mobile stations performing the direct communications with the base station BS and to the mobile stations performing the communications with the base station BS via the relay station RS. The distributing unit 222 proportionally distributes, e.g., a distributable radio resource quantity $R_{all}$ on the basis of $J_{BS}$ and $J_{RS}$, and determines radio resource quantities ($R_{BS}$, $R_{RS}$) for the distribution (S16).

<Transmission Frame 1>

Figure 10:
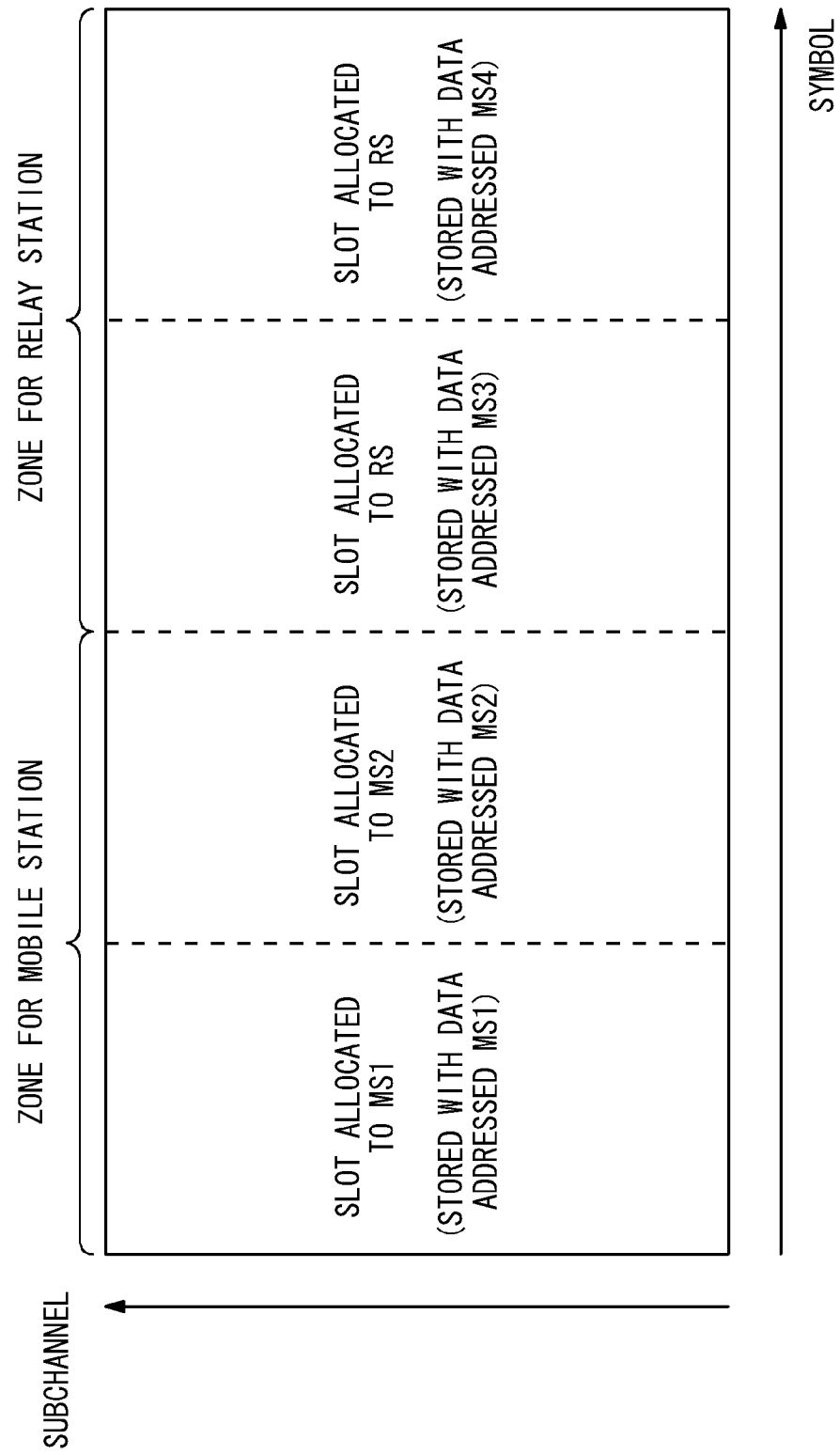
FIG. 10 is a diagram illustrating an example of a transmission frame of the wireless base station BS in the wireless communication system in FIG. 5.

FIG. 10 is a diagram illustrating an example of the transmission frame of the wireless base station BS in the wireless communication system of FIG. 5.

Herein, an assumption in the example of the wireless communication system of FIG. 5 is that the mobile stations MS1 and MS2 remain unmoved, and the radio channel quality does not change for a fixed period of time. At this time, each of the mobile stations MS1 and MS2 is given "1" as the evaluation value. Accordingly, the total $J_{BS}$ of the evaluation values of the mobile stations MS performing the direct communications with the base station BS becomes "2". Further, it is assumed that the virtual evaluation value, retained by the retaining unit 218 of the base station BS, of the mobile station performing the communications with the base station BS via the relay station RS, is "1". Moreover, the mobile station management unit 214 of the base station BS grasps that the mobile stations performing the communications with the base station BS via the relay station RS are two terminals, i.e., MS3 and MS4. Hence, the distributing unit 222 of the scheduler unit 220 calculates the total $J_{RS}$ of the evaluation values of the mobile stations performing the communications with the base station BS via the relay station RS, which is given by 1×2=2.

Therefore, a ratio of $J_{BS}$ to $J_{RS}$ is 1:1. Based on this ratio, the radio resources usable by the base station BS are distributed on a per-50%-basis to the mobile stations MS performing the direct communications with the base station BS and to the mobile stations MS performing the communications with the base station BS via the relay station RS, respectively.

Further, the allocating unit 224 allocates the transmission slots on the basis of the evaluation values of the respective mobile stations MS performing the direct communications with the base station BS and the virtual evaluation values of the mobile stations MS performing the communications with the base station BS via the relay station RS. In the example in FIG. 10, the evaluation value and the virtual evaluation value of each mobile station take the same value, and hence the same quantity of transmission slot is allocated on the per-mobile-station basis. The mobile stations MS3 and MS4, however, perform the communications with the base station BS via the relay station RS. Therefore, the data addressed to the mobile stations MS3 and MS4 are stored in the transmission slots allocated to the relay station RS. The transmission slots are fairly allocated based on the evaluation values to the respective mobile stations.

Figure 11:
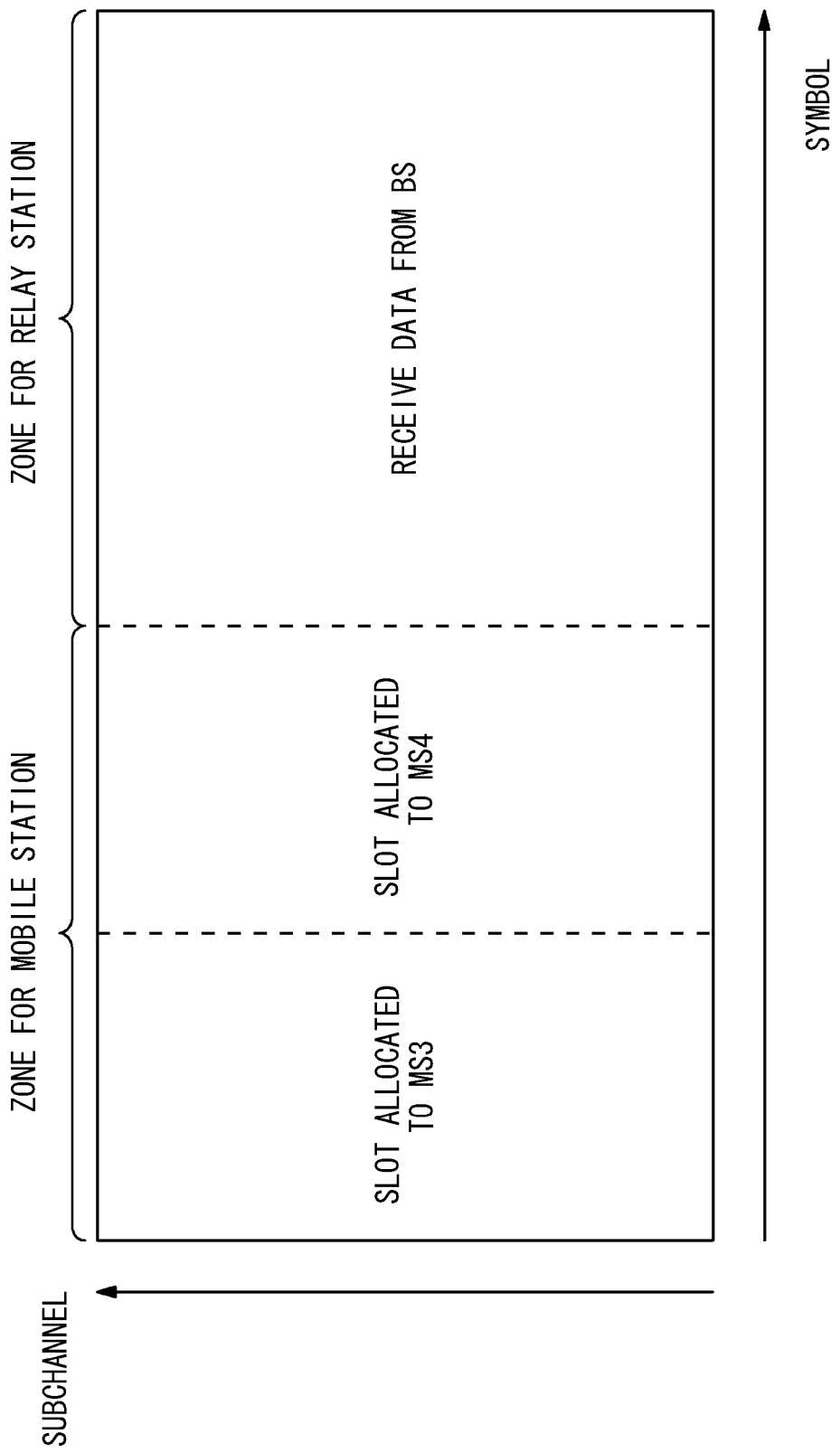
FIG. 11 is a diagram illustrating an example of the transmission frame of the relay station RS in the wireless communication system in FIG. 5.

FIG. 11 is a diagram illustrating an example of the transmission slots of the relay station RS in the wireless communication system of FIG. 5.

In the example of FIG. 11, the allocating unit 324 of the relay station RS allocates the 50% transmission slots for the communications with the base station and allocates the 50% transmission slots for the communications with the mobile stations performing the communications with the relay station RS. Moreover, the allocating unit 324 allocates, to the mobile station MS3, a half of the transmission slots allocated to the mobile stations and allocates a remaining half of the transmission slots to the MS4. This allocation is done based on the evaluation values of the respective mobile stations.

<Transmission Frame 2>

Figure 12:
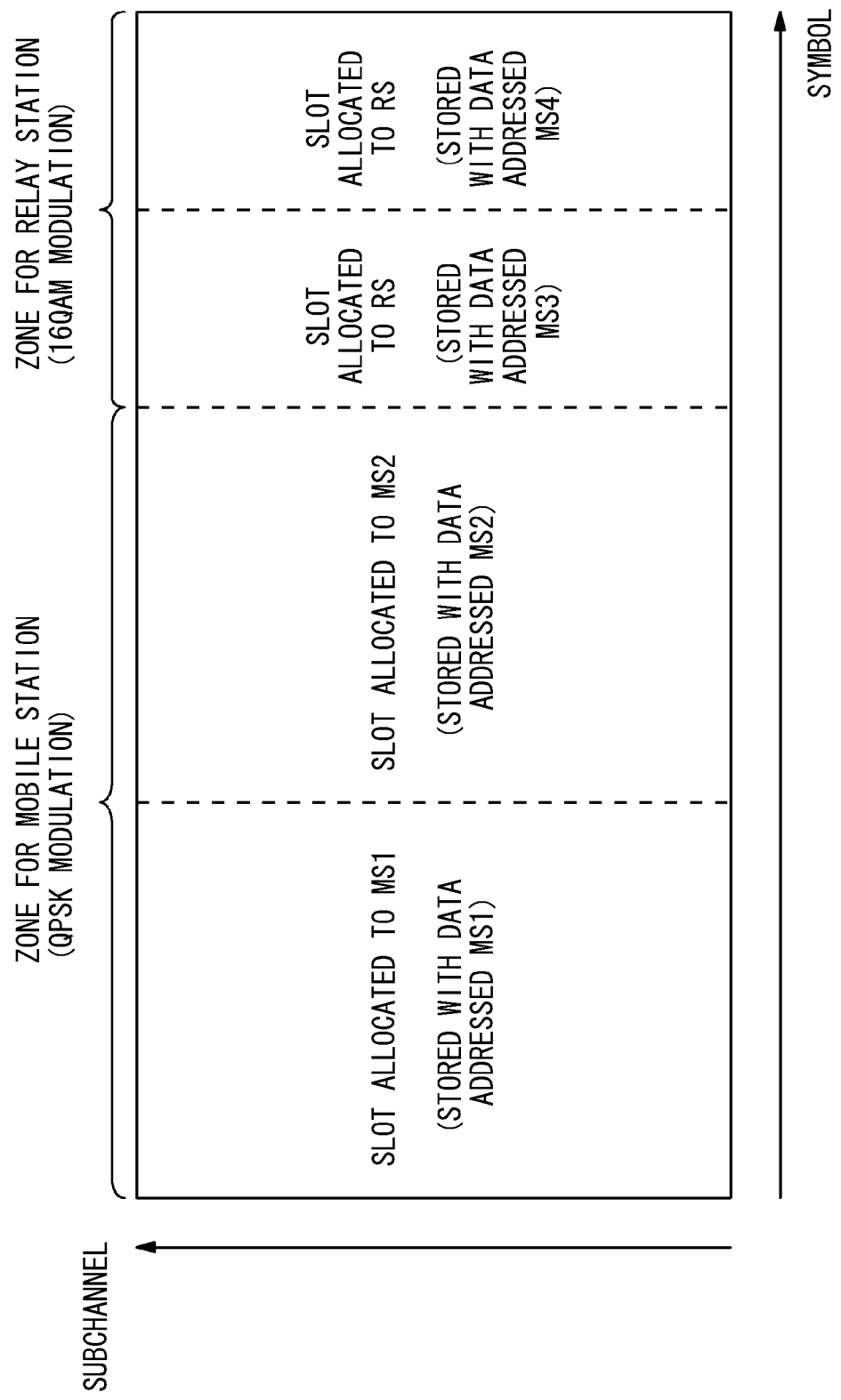
FIG. 12 is a diagram illustrating another example of the transmission frame of the wireless base station BS in the wireless communication system in FIG. 5.

FIG. 12 is a diagram illustrating another example of the transmission frames of the wireless base station BS in the wireless communication system of FIG. 5. The evaluation value and the virtual evaluation value of the mobile station are the same as in the example given above.

In the base station BS, the distributing unit 222 can, on the occasion of distributing the radio resources, distribute the radio resources in a way that takes into consideration differences in modulation method to be used between the base station BS (or the relay station RS) and the mobile station and between the base station BS and the relay station RS. Normally, the antenna of the relay station RS is installed so as not to be intercepted by a shielding object such as a building between the base station BS and the relay station RS. The antenna being thus installed, the communications between the base station BS and the relay station RS turn out to be LOS (Line Of Sight) communications. The communications between the base station BS and the mobile station become NLOS (Non Line Of Sight) communications due to the shielding object such as the building in many cases. The LOS communications have a stronger reception signal and a higher CINR than the NLOS communications have and can therefore use a much faster modulation method.

In the example of FIG. 12, the modulation between the base station BS and the mobile station MS is conducted by QPSK (Quadrature Phase Shift Keying: a modulation method), while the modulation between the base station BS and the relay station RS is carried out by 16QAM (16 Quadrature Amplitude Modulation: a modulation method). The 16QAM has a modulation speed that is twice as fast as the QPSK. Accordingly, in the 16QAM, a transmission slot count needed for transmitting the same data quantity (bit count) is a half of the transmission slot count of the QPSK. In the example of FIG. 12, the transmission slots, allocated to the zone for the mobile stations, of the mobile stations MS1 and MS2 are twice as large as the transmission slots allocated to the zone for the relay station.

Figure 13:
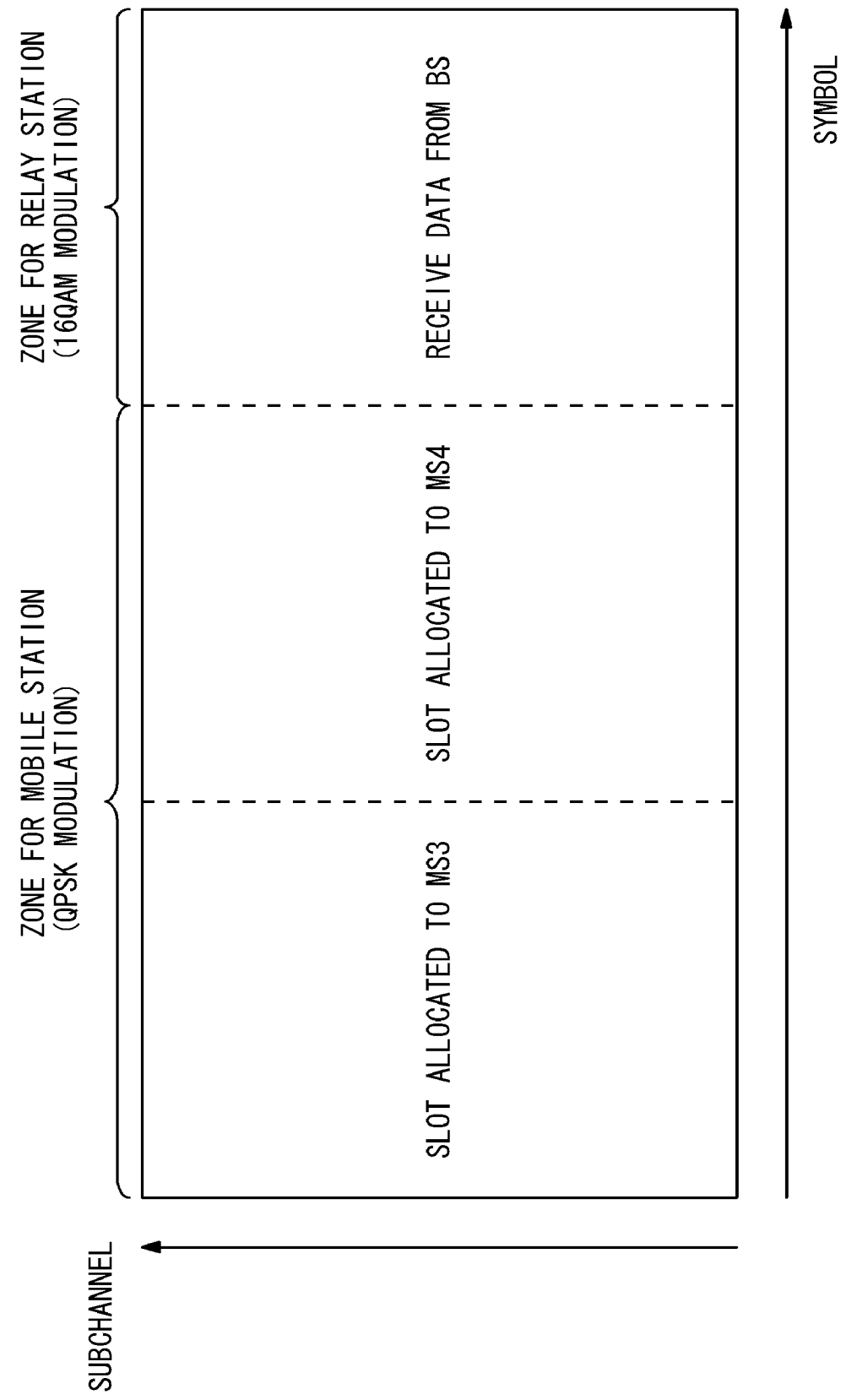
FIG. 13 is a diagram illustrating another example of the transmission frame of the relay station RS in the wireless communication system in FIG. 5.

FIG. 13 is a diagram illustrating another example of the transmission frame of the relay station RS in the wireless communication system of FIG. 5.

In the example of FIG. 13, the modulation between the relay station RS and the mobile station MS is conducted by the QPSK, while the modulation between the base station BS and the relay station RS is carried out by 16QAM.

Due to the re-modulation to the QPSK in the relay station RS, the slot count required for transmitting the data addressed to the mobile stations MS3 and MS4 is twice the slot count in the 16QAM. As a result, the transmission counts allocated to the mobile stations MS1, MS2, MS and MS4 are all equalized.

<Weight Coefficient>

The distribution of the radio resources is adjusted with a weight coefficient, in which case the distributing unit 222 of the scheduler unit 220 can use the weight coefficient on the occasion of the radio resource distributing calculation. At this time, the retaining unit 218 retains a weight coefficient $W_{BS}$ of the mobile station MS performing the direct communications with the base station BS and a weight coefficient $W_{RS}$ of the mobile station MS performing the communications with the base station BS via the relay station RS.

FIG. 14 is a diagram illustrating an example of a resource distributing calculation formula in the case of adjusting the distribution of the radio resources with the weight coefficients.

For example, supposing that the respective evaluation values are the same as those given above, the weight coefficient is $W_{BS}$ 0.6 and the weight coefficient $W_{RS}$ is 0.4, the radio resource quantity distributed to the mobile stations MS performing the direct communications with the base station BS and the radio resource quantity distributed to the mobile stations MS performing the communications with the base station BS via the relay station RS, can be set 60% and 40% respectively. With this scheme, in addition to a point of view of the fairness among the mobile stations MS, a common carrier, which provides communication services by employing the wireless relay communication system, can adjust the radio resource quantity to be distributed.

FIG. 15 is a diagram illustrating another example of the resource distributing calculation formula in the case of adjusting the distribution of the radio resources with the weight coefficients.

As in the example of FIG. 15, in the distribution formula in step S16 of FIG. 9, the total value of the evaluation values can be multiplied by the weight coefficients as $J_{BS}W_{BS}$ in place of $J_{BS}$ and $J_{RS}W_{RS}$ in place of $J_{RS}$. With this contrivance, the distributing unit 222 can distribute all of the radio resource quantities $R_{all}$ distributable by the base station BS in a way that reflects the evaluation values of the individual mobile stations and the preset weights.

FIG. 16 is a diagram illustrating still another example of the resource distributing calculation formula in the case of adjusting the distribution of the radio resources with the weight coefficients.

For example, it is assumed that the respective evaluation values are the same as those given above, the weight coefficient is $W_{BS}$ 0.6 and the weight coefficient $W_{RS}$ is 0.4. The distributing unit 222 can respectively distribute 60% and 40% of the radio resource quantities $R_{all}$ distributable by the base station BS as the radio resource quantity distributed to the mobile stations MS performing the direct communications with the base station BS and as the radio resource quantity distributed to the mobile stations MS performing the communications with the base station BS via the relay station RS.

The distributing unit 222 of the scheduler unit 220 can determine how the radio resource quantities are distributed by using only the ratio of the weight coefficients without employing the evaluation values and the virtual evaluation values of the respective mobile stations.

According to the configuration of the first embodiment, the wireless base station can collect, from the mobile stations, the information on the radio channel qualities for the mobile stations performing the direct communications with the base station, and can collect the information on the radio channel qualities for the mobile stations performing the communications with the base station via the relay station by reading the information from the retaining unit. Furthermore, the wireless base station can distribute the radio resources on the basis of the information on the radio channel qualities for the mobile stations performing the direct communications with the base station and the information on the radio channel qualities for the mobile stations performing the communications with the base station via the relay station.

Further, the wireless base station can adjust the radio resource quantities distributed by the common carrier providing the communication services by use of the wireless relay communication system in a way that utilizes the weight coefficients.

Second Embodiment

Next, the discussion on a second embodiment will be made.

The second embodiment has the points which are common to the first embodiment. Accordingly, the discussion will be focused on different points, while the description of the common points is omitted.

Configuration

<Network>

Figure 17:
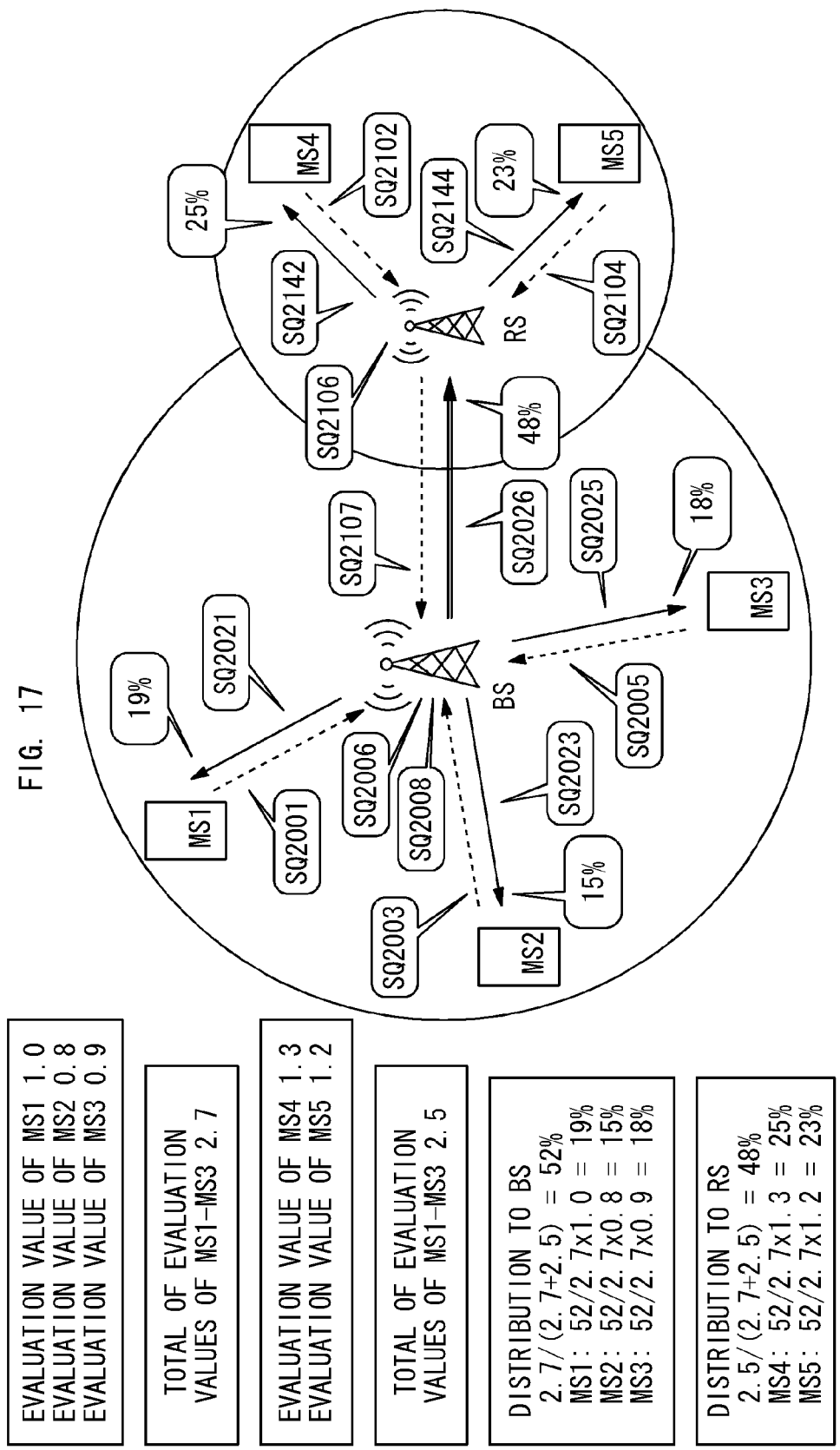
FIG. 17 is a diagram illustrating an outline of the wireless communication system in a second embodiment.

FIG. 17 is a view illustrating an outline of a wireless communication system in a second embodiment.

The wireless communication system illustrated in FIG. 17 includes the wireless base station (BS: Base Station), the relay station (RS: Relay Station) and wireless terminals (MSs: Mobile Stations). In the example of FIG. 17, the five mobile stations (MSs) MS1-MS5 exist. The mobile stations MS1, MS2 and MS3 are located in the area enabling the MS1, MS2, MS3 to perform the direct communications with the base station BS. Further, the mobile stations MS4 and MS5 are located in the area enabling the MS4, MS5 to perform the communications with the base station BS via the relay station RS. The base station BS is connected to the high-order network (unillustrated) and forwards pieces of data, which are transmitted and received by the mobile stations MS1-MS5, to the high-order network.

<Wireless Base Station>

Figure 18:
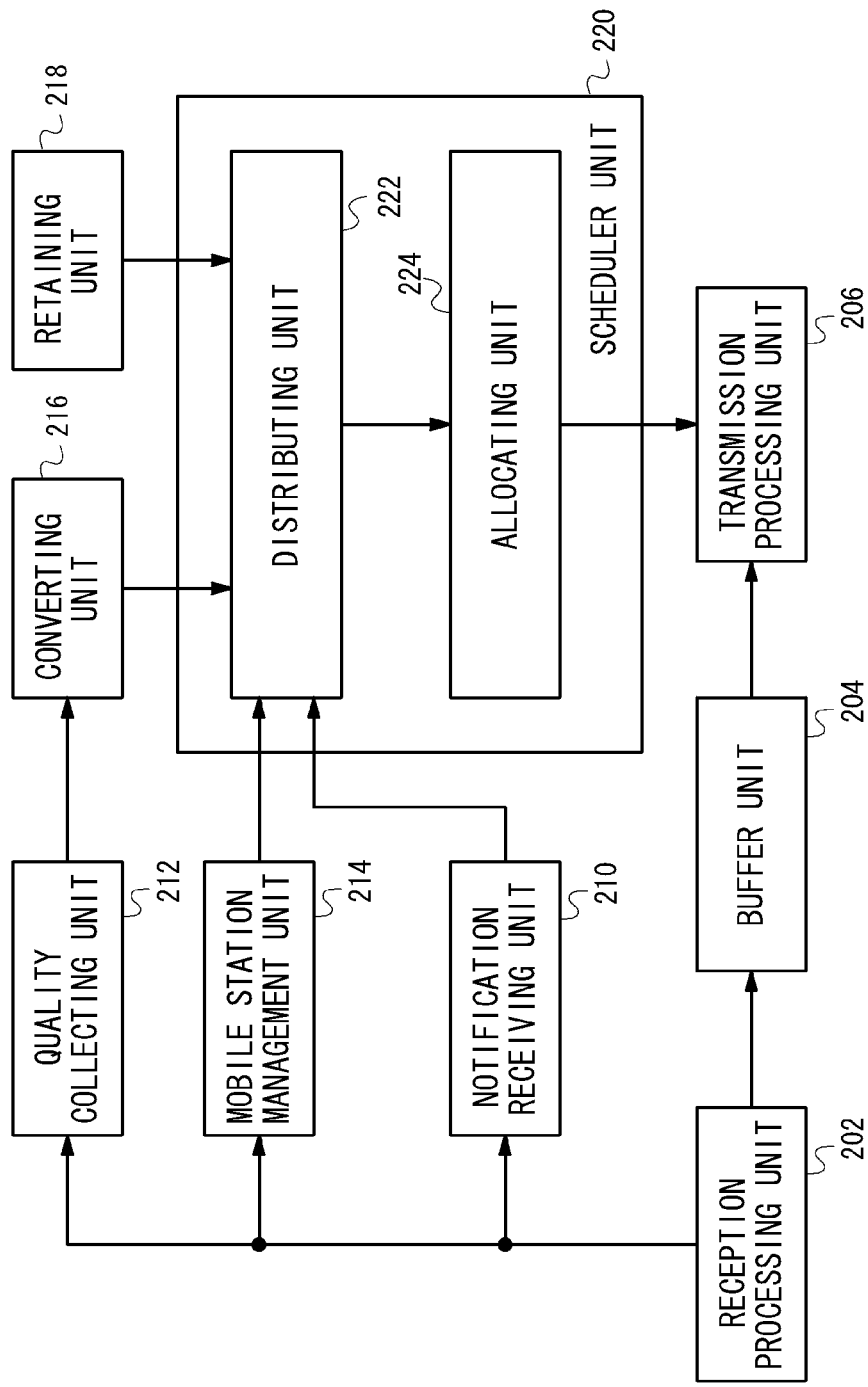
FIG. 18 is a diagram illustrating an example of a basic configuration of the wireless base station (BS) in the second embodiment.

FIG. 18 is a diagram illustrating an example of a basic configuration of the wireless base station (BS). The base station BS includes the reception processing unit 202, the buffer unit 204, the transmission processing unit 206, a notification receiving unit 210, the quality collecting unit 212, the terminal (mobile station) management unit 214, the converting unit 216, the retaining unit 218, and the scheduler unit 220 having the distributing unit 222 and the allocating unit 224. Note that the reception processing unit 202 and the transmission processing unit 206 are respectively connected to the unillustrated antennas.

The notification receiving unit 210 receives notification, given from the relay station RS, of the total value of the evaluation values of the mobile stations MS performing the communications with the base station BS via the relay station RS.

The retaining unit 218 can retain the weight coefficients for distributing the radio resources. In the second embodiment, the retaining unit 218 has no necessity for retaining the virtual evaluation values.

The scheduler unit 220 includes the distributing unit 222 and the allocating unit 224.

The distributing unit 222 distributes the radio resources into the radio resource quantities consumed respectively by the base station BS and the relay station RS, which involves using the evaluation values obtained from the conversion by the converting unit 216 and the weight coefficients retained by the retaining unit 218.

<Relay Station>

Figure 19:
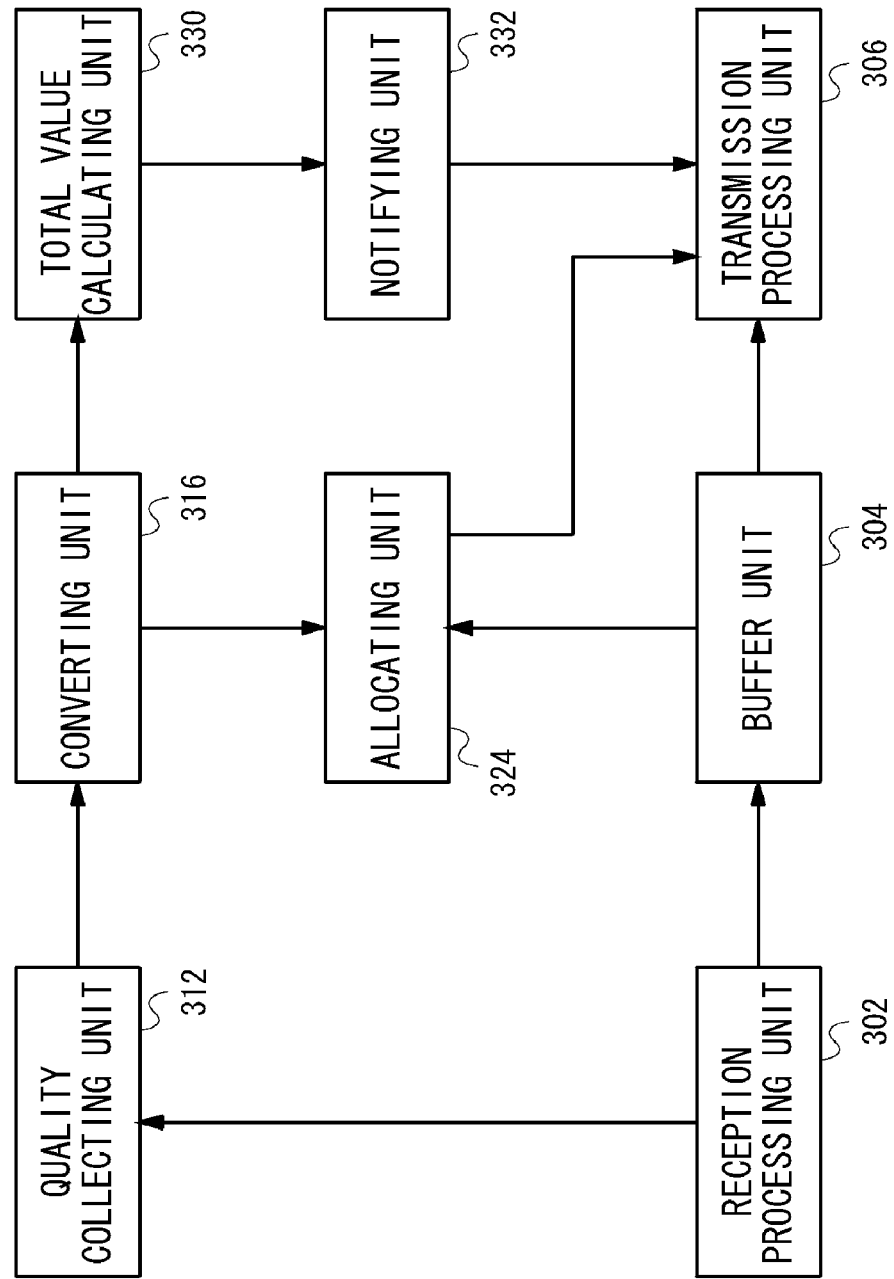
FIG. 19 is a diagram illustrating an example of a basic configuration of the relay station (RS) in the second embodiment.

FIG. 19 is a diagram illustrating an example of a basic configuration of the relay station (RS). The relay station RS includes the reception processing unit 302, the buffer unit 304, the transmission processing unit 306, the quality collecting unit 312, the converting unit 316, the allocating unit 324, a total value calculating unit 330 and a notifying unit 332. Note that the reception processing unit 302 and the transmission processing unit 306 are connected respectively to the unillustrated antennas.

The total value calculating unit 330 calculates a total value, of which the base station BS is notified, of the evaluation values of the mobile stations MS performing the communications with the base station BS via the relay station RS.

The notifying unit 332 notifies the base station BS of the total value of the evaluation values, which is calculated by the total value calculating unit 330.

Operation

FIG. 20 is a diagram illustrating an example of a communication sequence in the second embodiment.

The mobile station MS1 measures the CINR (Carrier to Interference Noise Ratio) and notifies the wireless base station BS of the measured CINR as the radio channel quality information (SQ2001). Similarly, each of the mobile stations MS2, MS3 measures the CINR and notifies the wireless base station BS of the measured CINR as the radio channel quality information (SQ2003, SQ2005). The notification thereof can involve using, in the case of IEEE802.16j system, the CQICH (Channel Quality Information Channel) message or the REP-RSP (Report Response) message. The radio channel quality can involve, without being limited to the CINR, using the RSSI (Receive Signal Strength Indication) and the SINR (Signal to Interference and Noise Ratio) as the radio channel quality.

Further, the mobile station MS4 measures the CINR and notifies the relay station RS of the measured CINR as the radio channel quality information (SQ2102). Similarly, the mobile station MS5 measures the CINR and notifies the relay station RS of the measured CINR as the radio channel quality information (SQ2104). The notification thereof can involve using, in the case of IEEE802.16j system, the CQICH (Channel Quality Information Channel) message or the REP-RSP (Report Response) message.

The converting unit 216 of the base station BS calculates the evaluation values and the total value thereof on the basis of the radio channel quality information (CINR information) collected from the mobile stations MS1, MS2, MS3 (SQ2006).

Further, the converting unit 316 of the relay station RS calculates the evaluation values on the basis of the radio channel quality information (CINR information) collected from the mobile stations MS4, MS5. The total value calculating unit 330 of the relay station RS totalizes the evaluation values of the respective mobile stations, which are calculated by the converting unit 316 (SQ2106).

The notifying unit 332 of the relay station RS notifies the base station BS of the total value (aggregated information) of the evaluation values calculated by the total value calculating unit 330 via the transmission processing unit 306 (SQ2107). Herein, the aggregated information is acquired by obtaining the total value of the qualities of the individual wireless terminals (mobile stations). As a matter of course, an available scheme is that without setting the total value of the qualities as the aggregated information, the relay station RS generates, as the aggregated information, count information of the mobile stations performing the communications with the base station BS via the relay station RS or quality average information and the count information, and transmits this aggregated information to the base station BS. Namely, the relay station RS can aggregate the information, useful for distributing the radio resources, on the individual mobile stations performing the communications with the base station BS via the relay station RS and can transmit the thus-aggregated information to the base station BS. Another process of restraining an information quantity (data size) under the information quantity (data size) in the case of transmitting the quality information of the individual mobile stations to the base station BS, is also exemplified as the aggregation process.

The notification receiving unit 210 of the base station BS receives the total value of the evaluation values, which has been transmitted from the relay station RS, via the reception processing unit 202. The notification receiving unit 210 transmits the received total value of the evaluation values to the distributing unit 222.

The distributing unit 222 of the base station BS conducts the radio resource distributing calculation (SQ2008). A specific method of the radio resource distributing calculation will be described later on.

The allocating unit 224 of the base station BS, after distributing the radio resources, allocates the transmission slots to the data addressed respectively to the mobile stations MS1, MS2 and MS3 by use of the radio resources distributed for the base station BS. Further, the allocating unit 224 of the base station BS allocates the transmission slots to the data addressed to the mobile stations MS4 and MS5, which should be relayed by the relay station RS, by use of the radio resources distributed for the relay station RS (SQ2010). The round robin algorithm, the PF (Proportional Fairness) algorithm, etc can be employed for the allocation thereof.

The transmission processing unit 206 of the base station BS generates, according to the allocated transmission slots, the radio frames stored with the transmission data addressed to the mobile stations MS1-MS5, and transmits the radio frames to the mobile stations MS1, MS2, MS3 and the relay station RS (SQ2021, SQ2023, SQ2025, SQ2026).

The reception processing unit 302 of the relay station RS receives the radio frames transmitted by the base station BS and extracts the transmission data addressed to the mobile stations MS4 and MS5. The allocating unit 324 of the relay station RS allocates the transmission slots on the radio frames transmitted by the relay station RS to the data addressed to the mobile stations MS4 and MS5 (SQ2130). The relay station RS, on the occasion of this allocation, may utilize the evaluation values of the mobile stations MS4 and MS5, which are calculated in SQ2106. Moreover, the allocation thereof can involve using the round robin algorithm, the PF algorithm, etc.

The transmission processing unit 306 of the relay station RS generates, according to the allocated transmission slots, the radio frames stored with the transmission data addressed to the mobile stations MS4 and MS5 and transmits the radio frames to the mobile stations MS4, MS5 (SQ2142, SQ2144).

<Radio Resource Distributing Calculation>

FIG. 21 is a flowchart illustrating a processing flow of the radio resource distributing calculation.

In the base station BS, the converting unit 216 converts the radio channel quality information, collected by the quality collecting unit 212, for every mobile station MS performing the direct communications with the base station BS into the evaluation value on the per-mobile-station-MS basis. The distributing unit 222 of the scheduler unit 220 calculates the total ($J_{BS}$) of the evaluation values obtained from the conversion by the converting unit 216 for every mobile station MS performing the direct communications with the base station BS (S22).

The distributing unit 222 of the scheduler unit 220 receives, from the notification receiving unit 210, a total value ($J_{RS}$) of the evaluation values of the mobile stations MS performing the communications with the base station BS via the relay station RS (S24).

The distributing unit 222 of the scheduler unit 220 distributes the radio resources to the mobile stations performing the direct communications with the base station BS and to the mobile stations performing the communications with the base station BS via the relay station RS. The distributing unit 222 proportionally distributes, e.g., the distributable radio resource quantity $R_{all}$ on the basis of $J_{BS}$ and $J_{RS}$, and determines the radio resource quantities ($R_{BS}$, $R_{RS}$) for the distribution (S26).

For example, it is assumed that the evaluation values calculated based on the radio channel qualities of the MS1 through MS5 are 1.0, 0.8, 0.9, 1.3 and 1.2 in sequence as in FIG. 17. In this case, the total of the evaluation values of the mobile stations MS (MS1, MS2, MS3) performing the direct communications with the base station BS is 2.7. Moreover, the total of the evaluation values of the mobile stations MS (MS4, MS5) performing the communications with the base station BS via the relay station RS is 2.5. At this time, the distributing unit 222 distributes 52% of the radio resources to the mobile stations MS performing the direct communications with the base station BS and 48% of the radio resources to the mobile stations MS performing the communications with the base station BS via the relay station RS.

Further, the radio resources can be distributed in proportion to the numbers of the mobile stations, i.e., on the basis of the number of the mobile stations performing the direct communications with the base station and the number of the mobile stations performing the communications with the base station via the relay station.

Furthermore, the distributing unit 222 of the scheduler unit 220 of the base station BS can, similarly to the case of the first embodiment, distribute the radio resources by use of the weight coefficients.

According to the configuration of the second embodiment, the wireless base station is capable of collecting the information on the radio channel quality between the relay station and the wireless mobile station without any excessive increase in traffic between the wireless base station and the relay station. Further, the wireless base station can distribute the radio resources on the basis of the information on the radio channel qualities related to the wireless mobile station performing the direct communications with the wireless base station and related to the wireless mobile station performing the communications with the wireless base station via the relay station and on the basis of the information on the number of the wireless mobile stations performing the direct or indirect communications with the wireless base station. Moreover, the relay station can collect the information on the radio channel quality from the wireless mobile stations performing the communications with the wireless base station via the relay station, then process the information and transmit the information to the wireless base station.

According to the configuration of the second embodiment, the aggregated information is transmitted to the wireless base station from the relay station, whereby it is feasible to restrain the traffic between the relay station and the wireless base station, which increases for distributing the radio resources.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A parameter collecting method used for distributing radio resources, comprising:
   collecting, as a parameter, a total number (M) of terminals performing wireless communications directly with a wireless base station without via a relay station or a radio quality between each of said terminals performing the wireless communications directly with said wireless base station without via said relay station and said wireless base station; and
   collecting, as a parameter, a total number (N) of said terminals performing the wireless communications with said wireless base station via said relay station or aggregated information of radio qualities between each of said terminals performing the wireless communication with said wireless base station via said relay station and said relay station,
   wherein the total number (N) of said terminals performing the wireless communications with said wireless base station via said relay station is acquired from a management unit in said wireless base station, which manages said terminals performing the wireless communications via said relay station, or acquired in said wireless base station by transmitting the total number (N) of said terminals to said wireless base station from said relay station.

2. A parameter collecting method according to claim 1, wherein the radio quality is any one of a Receive Signal Strength Indicator, a Signal to Interference Noise Ratio and a Carrier to Interference Noise Ratio.

3. A parameter collecting method according to claim 1, wherein when the radio qualities are collected, a value obtained by dividing an instantaneous value of the radio qualities by a time-wise average value of the radio qualities, is used for the distribution.

4. A parameter collecting method used for distributing radio resources, comprising:
   collecting, as a parameter, a total number (M) of terminals performing wireless communications directly with a wireless base station without via a relay station or a radio quality between each of said terminals performing the wireless communications directly with said wireless base station without via said relay station and said wireless base station; and
   collecting, as a parameter, a total number (N) of said terminals performing the wireless communications with said wireless base station via said relay station or aggregated information of radio qualities between each of said terminals performing the wireless communication with said wireless base station via said relay station and said relay station,
   wherein the aggregated information is the aggregated information acquired by aggregating, in said relay station, the information on the radio qualities between each of said terminals performing the wireless communications with said wireless base station via said relay station and said relay station, and
   said wireless base station conducts the collection by receiving the aggregated information from said relay station.

5. A parameter collecting method according to claim 4, wherein the aggregated information contains the total number (N) of said terminals.

6. A parameter collecting method used for distributing radio resources, comprising:
   collecting, as a parameter, a total number (M) of terminals performing wireless communications directly with a wireless base station without via a relay station or a radio quality between each of said terminals performing the wireless communications directly with said wireless base station without via said relay station and said wireless base station; and
   collecting, as a parameter, a total number (N) of said terminals performing the wireless communications with said wireless base station via said relay station or aggregated information of radio qualities between each of said terminals performing the wireless communication with said wireless base station via said relay station and said relay station,
   wherein said wireless base station retains, in a storage unit, weight coefficients for adjusting a ratio of the radio resources distributed to said terminals performing wireless communications directly with said wireless base station without via said relay station and distributed to said terminals performing the wireless communications with said wireless base station via said relay station, and
   the radio resources are distributed based on the weight coefficients.

7. A parameter collecting method used for distributing radio resources, comprising:
   collecting, as a parameter, a total number (M) of terminals performing wireless communications directly with a wireless base station without via a relay station or a radio quality between each of said terminals performing the wireless communications directly with said wireless base station without via said relay station and said wireless base station; and
   collecting, as a parameter, a total number (N) of said terminals performing the wireless communications with said wireless base station via said relay station or aggregated information of radio qualities between each of said terminals performing the wireless communication with said wireless base station via said relay station and said relay station,
   wherein when the total number (M) of said terminals and the total number (N) of said terminals are collected, the distribution is conducted corresponding to a ratio of the total number (M) of said terminals to the total number (N) of said terminals.

8. A wireless base station to collect a parameter used for distributing radio resources, comprising:
   a collecting unit to collect, as a parameter, a total number (M) of terminals performing wireless communications directly with said wireless base station without via a relay station or a radio quality between each of said terminals performing the wireless communications directly with said wireless base station without via said relay station and said wireless base station, and to collect, as a parameter, a total number (N) of said terminals performing the wireless communications with said wireless base station via said relay station or aggregated information of radio qualities between each of said terminals performing the wireless communication with said wireless base station via said relay station and said relay station,
   a management unit to manage said terminals performing the wireless communications via said relay station in said wireless base station,
   wherein the total number (N) of said terminals performing the wireless communications with said wireless base station via said relay station is acquired from said management unit.

9. A wireless base station according to claim 8, wherein the radio quality is any one of a Receive Signal Strength Indicator, a Signal to Interference Noise Ratio and a Carrier to Interference Noise Ratio.

10. A wireless base station according to claim 8, wherein when the radio qualities are collected, said collecting unit distributes the radio resources on the basis of a value obtained by dividing an instantaneous value of the radio qualities by a time-wise average value of the radio qualities.

11. A wireless base station to collect a parameter used for distributing radio resources, comprising:
   a collecting unit to collect, as a parameter, a total number (M) of terminals performing wireless communications directly with said wireless base station without via a relay station or a radio quality between each of said terminals performing the wireless communications directly with said wireless base station without via said relay station and said wireless base station, and to collect, as a parameter, a total number (N) of said terminals performing the wireless communications with said wireless base station via said relay station or aggregated information of radio qualities between each of said terminals performing the wireless communication with said wireless base station via said relay station and said relay station,
   wherein the total number (N) of said terminals performing the wireless communications with said wireless base station via said relay station is acquired by said collecting unit's receiving the total number (N) of said terminals from said relay station.

12. A wireless base station to collect a parameter used for distributing radio resources, comprising:
a collecting unit to collect, as a parameter, a total number (M) of terminals performing wireless communications directly with said wireless base station without via a relay station or a radio quality between each of said terminals performing the wireless communications directly with said wireless base station without via said relay station and said wireless base station, and to collect, as a parameter, a total number (N) of said terminals performing the wireless communications with said wireless base station via said relay station or aggregated information of radio qualities between each of said terminals performing the wireless communication with said wireless base station via said relay station and said relay station,
wherein the aggregated information is the aggregated information acquired by aggregating, in said relay station, the information on the radio qualities between each of said terminals performing the wireless communications with said wireless base station via said relay station and said relay station, and
said collecting unit conducts the collection by receiving the aggregated information from said relay station.

13. A wireless base station according to claim 12, wherein the aggregated information contains the total number (N) of said terminals.

14. A wireless base station to collect a parameter used for distributing radio resources, comprising:
a collecting unit to collect, as a parameter, a total number (M) of terminals performing wireless communications directly with said wireless base station without via a relay station or a radio quality between each of said terminals performing the wireless communications directly with said wireless base station without via said relay station and said wireless base station, and to collect, as a parameter, a total number (N) of said terminals performing the wireless communications with said wireless base station via said relay station or aggregated information of radio qualities between each of said terminals performing the wireless communication with said wireless base station via said relay station and said relay station,
a storage unit to retain weight coefficients for adjusting a ratio of the radio resources distributed to said terminals performing the wireless communications directly with said wireless base station without via said relay station and distributed to said terminals performing the wireless communications with said wireless base station via said relay station, and
the said collecting unit distributes the radio resources on the basis of the weight coefficients.

15. A wireless base station to collect a parameter used for distributing radio resources, comprising:
a collecting unit to collect, as a parameter, a total number (M) of terminals performing wireless communications directly with said wireless base station without via a relay station or a radio quality between each of said terminals performing the wireless communications directly with said wireless base station without via said relay station and said wireless base station, and to collect, as a parameter, a total number (N) of said terminals performing the wireless communications with said wireless base station via said relay station or aggregated information of radio qualities between each of said terminals performing the wireless communication with said wireless base station via said relay station and said relay station,
wherein when the total number (M) of said terminals and the total number (N) of said terminals are collected, said collecting unit distributes the radio resources, corresponding to a ratio of the total number (M) of said terminals to the total number (N) of said terminals.

16. A relay station to relay between a wireless base station to collect a parameter used for distributing radio resources and a terminal, comprising:
a transmitting unit to transmit, to said wireless base station, a total number (N) of said terminals performing the wireless communications with said wireless base station via said relay station or aggregated information of radio qualities between each of said terminals performing the wireless communication with said wireless base station via said relay station and said relay station,
wherein the aggregated information contains the total number (N) of said terminals performing the wireless communications with said wireless base station via said relay station.

17. A relay station according to claim 16, further comprising:
an acquiring unit to acquire the radio qualities of said terminals performing the wireless communications with said wireless base station via said relay station and said relay station; and
an aggregating unit to aggregate the radio qualities into aggregated information.

* * * * *